(12) United States Patent
Ettema et al.

(10) Patent No.: US 10,404,661 B2
(45) Date of Patent: *Sep. 3, 2019

(54) INTEGRATING A HONEY NETWORK WITH A TARGET NETWORK TO COUNTER IP AND PEER-CHECKING EVASION TECHNIQUES

(71) Applicant: Palo Alto Networks, Inc., Santa Clara, CA (US)

(72) Inventors: Taylor Ettema, San Jose, CA (US); Huagang Xie, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,637

(22) Filed: Jul. 9, 2018

(65) Prior Publication Data

US 2018/0332005 A1 Nov. 15, 2018

Related U.S. Application Data

(63) Continuation of application No. 14/503,145, filed on Sep. 30, 2014, now Pat. No. 10,044,675.

(51) Int. Cl.
*H04L 29/06* (2006.01)
*G06F 9/455* (2018.01)
(Continued)

(52) U.S. Cl.
CPC ............ *H04L 63/0227* (2013.01); *G06F 8/60* (2013.01); *G06F 9/45533* (2013.01);
(Continued)

(58) Field of Classification Search
None
See application file for complete search history.

(56) References Cited

U.S. PATENT DOCUMENTS 5,623,600 A 4/1997 Ji
5,842,002 A 11/1998 Schnurer
(Continued)

FOREIGN PATENT DOCUMENTS

WO WO-2008054952 5/2008
WO WO-2012092251 7/2012
(Continued)

OTHER PUBLICATIONS

Author Unknown, The Honeywell Project, Know Your Enemy: Learning about Security Threats, Second Edition, Addison Wesley, 2004, ISBN 0-321-16646-9.
(Continued)

*Primary Examiner* — Tri M Tran
(74) *Attorney, Agent, or Firm* — Van Pelt, Yi & James LLP

(57) ABSTRACT

Techniques for integrating a honey network with a target network environment (e.g., an enterprise network) to counter IP and peer-checking evasion techniques are disclosed. In some embodiments, a system for integrating a honey network with a target network environment includes a device profile data store that includes a plurality of attributes of each of a plurality of devices in the target network environment; a virtual clone manager executed on a processor that instantiates a virtual clone of one or more devices in the target network environment based on one or more attributes for a target device in the device profile data store; and a honey network policy that is configured to route an external network communication from the virtual clone for the target device in the honey network to an external device through the target network environment.

20 Claims, 9 Drawing Sheets

(51) Int. Cl.
*G06F 8/60* (2018.01)
*G06F 8/61* (2018.01)

(52) U.S. Cl.
CPC ...... *G06F 9/45558* (2013.01); *H04L 63/1491* (2013.01); *G06F 8/63* (2013.01); *G06F 2009/45587* (2013.01)

(56) References Cited

U.S. PATENT DOCUMENTS

| | | |
|---|---|---|
| 6,151,635 A | 11/2000 | Bare |
| 6,357,008 B1 | 3/2002 | Nachenberg |
| 6,775,780 B1 | 8/2004 | Muttik |
| 7,370,360 B2 | 5/2008 | Van Der Made |
| 7,409,719 B2 | 8/2008 | Armstrong |
| 7,664,626 B1 | 2/2010 | Ferrie |
| 7,725,937 B1 | 5/2010 | Levy |
| 8,060,074 B2 | 11/2011 | Danford |
| 8,151,352 B1 | 4/2012 | Novitchi |
| 8,170,859 B1 | 5/2012 | Christensson |
| 8,341,749 B2 | 12/2012 | Rogel |
| 8,365,297 B1 | 1/2013 | Parshin |
| 8,370,932 B2 | 2/2013 | Adams |
| 8,473,931 B2 | 6/2013 | Wu |
| 8,505,097 B1 | 8/2013 | Juels |
| 8,533,778 B1 | 9/2013 | Dalcher |
| 8,549,643 B1 | 10/2013 | Shou |
| 8,555,386 B1 | 10/2013 | Belov |
| 8,813,226 B2 | 8/2014 | Chung |
| 8,832,836 B2 | 9/2014 | Thomas |
| 8,898,276 B1 | 11/2014 | Pimentel |
| 8,918,877 B1 | 12/2014 | Xie |
| 8,966,625 B1 | 2/2015 | Zuk |
| 8,990,944 B1 | 3/2015 | Singh |
| 8,997,078 B2 | 3/2015 | Spivak |
| 9,009,823 B1 | 4/2015 | Ismael |
| 9,021,092 B2 | 4/2015 | Silva |
| 9,021,260 B1 | 4/2015 | Falk |
| 9,027,135 B1 | 5/2015 | Aziz |
| 9,038,185 B2 | 5/2015 | Livshits |
| 9,100,428 B1 | 8/2015 | Visbal |
| 9,104,870 B1 | 8/2015 | Qu |
| 9,117,079 B1 | 8/2015 | Huang |
| 9,159,035 B1 | 10/2015 | Ismael |
| 9,165,142 B1 | 10/2015 | Sanders |
| 9,171,160 B2 | 10/2015 | Vincent |
| 9,176,843 B1 | 11/2015 | Ismael |
| 9,178,900 B1 | 11/2015 | Li |
| 9,215,239 B1 | 12/2015 | Wang |
| 9,223,972 B1 | 12/2015 | Vincent |
| 9,262,635 B2 | 2/2016 | Paithane |
| 9,294,442 B1 | 3/2016 | Lian |
| 9,336,103 B1 | 5/2016 | Hasbe |
| 9,367,681 B1 | 6/2016 | Ismael |
| 9,459,912 B1 | 10/2016 | Durniak |
| 9,495,188 B1 | 11/2016 | Ettema |
| 9,736,179 B2 | 8/2017 | Ismael |
| 9,860,208 B1 | 1/2018 | Ettema |
| 9,882,929 B1 | 1/2018 | Ettema |
| 9,922,193 B2 | 3/2018 | Adams |
| 2002/0184528 A1 | 12/2002 | Shevenell |
| 2003/0208602 A1 | 11/2003 | Bhalla |
| 2004/0078592 A1 | 4/2004 | Fagone |
| 2006/0010209 A1 | 1/2006 | Hodgson |
| 2006/0018466 A1 | 1/2006 | Adelstein |
| 2006/0021050 A1 | 1/2006 | Cook et al. |
| 2006/0101515 A1 | 5/2006 | Amoroso |
| 2006/0112174 A1 | 5/2006 | L'Heureux |
| 2006/0161982 A1 | 7/2006 | Chari |
| 2007/0101430 A1 | 5/2007 | Raikar |
| 2007/0208822 A1 | 9/2007 | Wang |
| 2007/0261112 A1 | 11/2007 | Todd |
| 2008/0098476 A1 | 4/2008 | Syversen |
| 2008/0271019 A1 | 10/2008 | Stratton |
| 2009/0198817 A1 | 8/2009 | Sundaram |
| 2009/0204964 A1 | 8/2009 | Foley |
| 2009/0241191 A1 | 9/2009 | Keromytis |
| 2009/0288084 A1 | 11/2009 | Astete |
| 2010/0122343 A1 | 5/2010 | Ghosh |
| 2011/0004676 A1 | 1/2011 | Kawato |
| 2011/0321165 A1 | 12/2011 | Capalik |
| 2012/0054396 A1 | 3/2012 | Bhattacharya |
| 2012/0192175 A1 | 7/2012 | Dorai |
| 2012/0240236 A1 | 9/2012 | Wyatt |
| 2012/0290848 A1 | 11/2012 | Wang |
| 2012/0304244 A1 | 11/2012 | Xie |
| 2012/0324446 A1 | 12/2012 | Fries |
| 2013/0007732 A1 | 1/2013 | Fries |
| 2013/0074186 A1 | 3/2013 | Muttik |
| 2013/0117848 A1 | 5/2013 | Golshan |
| 2013/0145465 A1 | 6/2013 | Wang |
| 2013/0283264 A1 | 10/2013 | Bhattacharya |
| 2014/0026214 A1 | 1/2014 | Adams |
| 2014/0096229 A1 | 4/2014 | Burns |
| 2014/0115706 A1 | 4/2014 | Silva |
| 2014/0137255 A1 | 5/2014 | Wang |
| 2014/0143536 A1 | 5/2014 | Holland |
| 2014/0157058 A1 | 6/2014 | Bennah |
| 2014/0201836 A1 | 7/2014 | Amsler |
| 2014/0229939 A1 | 8/2014 | Dias De Assuncao |
| 2014/0245444 A1 | 8/2014 | Lutas |
| 2014/0337836 A1 | 11/2014 | Ismael |
| 2014/0351934 A1 | 11/2014 | Mitra |
| 2014/0380474 A1 | 12/2014 | Paithane |
| 2015/0058983 A1 | 2/2015 | Zeitlin |
| 2015/0067805 A1 | 3/2015 | Martin |
| 2015/0067862 A1 | 3/2015 | Yu |
| 2015/0096025 A1 | 4/2015 | Ismael |
| 2015/0199343 A1 | 7/2015 | Dabak |
| 2015/0220735 A1 | 8/2015 | Paithane |
| 2015/0244730 A1 | 8/2015 | Vu |
| 2015/0248554 A1 | 9/2015 | Dumitru |
| 2015/0326588 A1 | 11/2015 | Vissamsetty |
| 2015/0326599 A1 | 11/2015 | Vissamsetty |
| 2016/0004869 A1 | 1/2016 | Ismael |
| 2016/0042179 A1 | 2/2016 | Weingarten |
| 2016/0080415 A1 | 3/2016 | Wu |
| 2016/0149950 A1 | 5/2016 | Ashley |
| 2017/0185779 A1 | 6/2017 | Adams |
| 2017/0366610 A1 | 12/2017 | Martin |

FOREIGN PATENT DOCUMENTS

| | | |
|---|---|---|
| WO | WO-2012092252 | 7/2012 |
| WO | WO-2013067505 | 5/2013 |
| WO | WO-2013067508 | 5/2013 |

OTHER PUBLICATIONS

Baecher et al., The Nepenthes Platform: An Efficient Approach to Collect Malware, RAID 2006, LNCS 4219, pp. 165-184, 2006.

Blasing et al., An Android Application Sandbox System for Suspicious Software Detection, 2010.

Ceron et al., MARS: An SDN-Based Malware Analysis Solution, 2016 IEEE Symposium on Computers and Communication (ISCC), Aug. 2016, pp. 1-6.

Chen et al., Towards an Understanding of Anti-Virtualization and Anti-Debugging Behavior in Modem Malware, 2008.

Curtis R. Taylor, Leveraging Software-Defined Networking and Virtualization for a One-to-One Client-Server Model, Worcester Polytechnic Institute, May 2014, pp. 1-18.

Garfinkel et al., Compatibility is Not Transparency: VMM Detection Myths and Realities, Mar. 2, 2014.

Hecker et al., 'Automated Honeynet Deployment for Dynamic Network Environment', IEEE, Jan. 7-10, 2013, 2013 46th Hawaii International Conference on System Sciences, pp. 4880-4889; <http://ieeexplore.ieee.org/stamp/stamp.jsp?tp=&arnumber=6480433>.

Jiang et al., Stealthy Malware Detection Through VMM-Based 'Out-of-the-Box' Semantic View Reconstruction, 2007.

King et al., SubVirt: Implementing Malware with Virtual Machines, 2006.

Provos et al., Virtual Honeypots: From Botnet Tracking to Intrusion Detection, Pearson Education, 2007, ISBN 10: 0-321-33632-1.

(56) References Cited

OTHER PUBLICATIONS

Roger A. Grimes, Honeypots for Windows, Apress, 2005, ISBN 1-59059-335-9.
Vadrevu et al., MAXS: Scaling Malware Execution with Sequential Multi-Hypothesis Testing, ASIA CCS'16, May 30-Jun. 3, 2016, pp. 771-782.
Yin et al., Panorama: Capturing System-Wide Information Flow for Malware Detection and Analysis, Carnegie Mellon University, Research Showcase @CMU, Department of Electrical and Computer Engineering, 2007.

US 10,404,661 B2

INTEGRATING A HONEY NETWORK WITH A TARGET NETWORK TO COUNTER IP AND PEER-CHECKING EVASION TECHNIQUES

CROSS REFERENCE TO OTHER APPLICATIONS

This application is a continuation of co-pending U.S. patent application Ser. No. 14/503,145 entitled INTEGRATING A HONEY NETWORK WITH A TARGET NETWORK TO COUNTER IP AND PEER-CHECKING EVASION TECHNIQUES filed Sep. 30, 2014 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
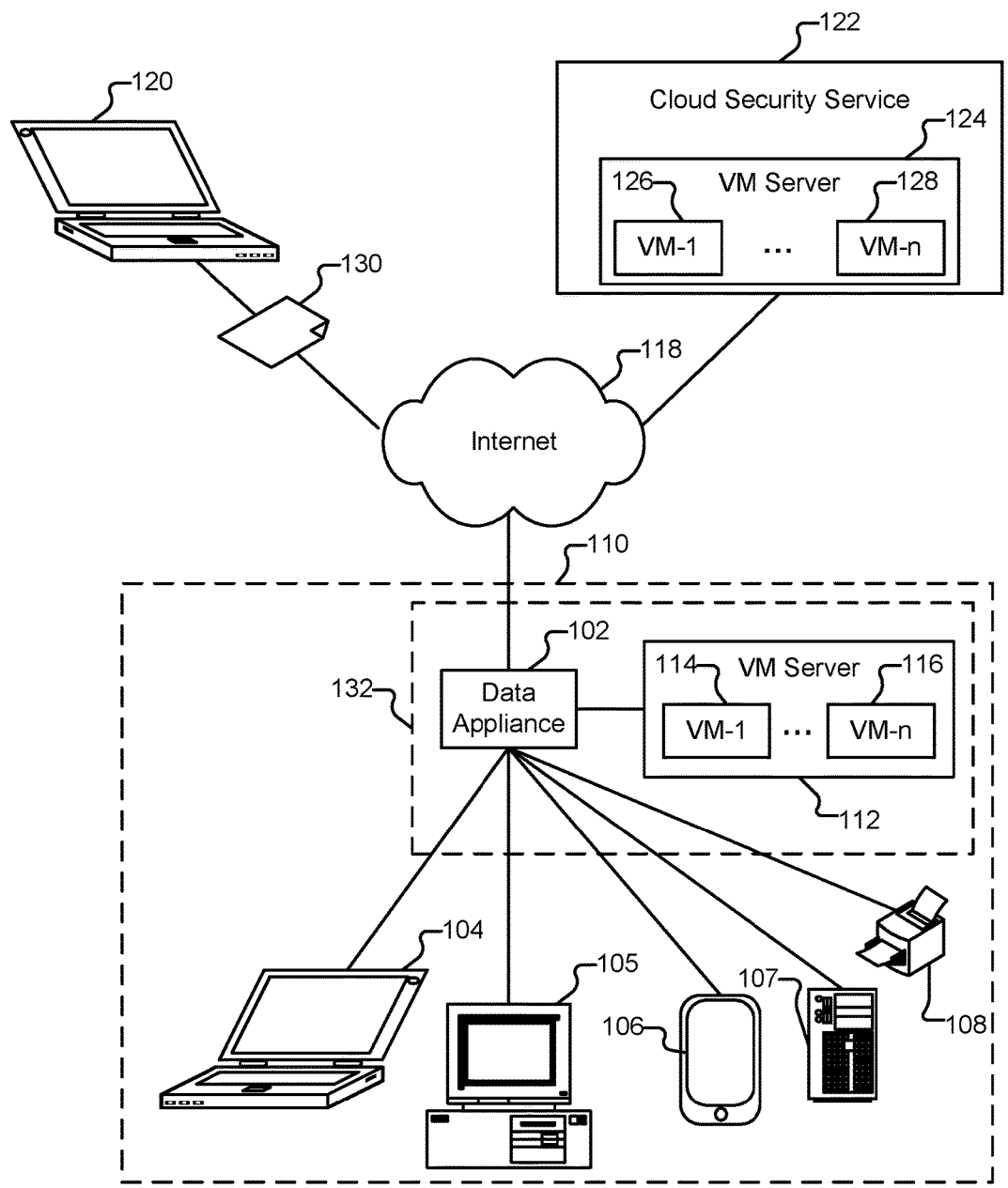
FIG. 1 is a diagram of an architecture for performing a dynamic analysis of advanced threats in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Dynamic Analysis for Advanced Threats

A significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and unknown threats). For example, a new zero-day threat and/or an advanced threat, such as an Advanced Persistent Threat (APT) (e.g., technically advanced adversaries that employ various techniques using malware to exploit vulnerabilities in systems and often using an external command and control (C&C) for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system of a device (e.g., a client device, a server, an appliance, a networking device, a printer, and/or other types of computing devices).

In particular, modern attackers are increasingly using targeted and new unknown variants of malware to avoid detection by traditional security solutions. For example, advanced security threats (e.g., advanced cyber-attacks) are employing stealthy, persistent methods to evade traditional security measures. Skilled adversaries (e.g., attackers) demand that modern security teams re-evaluate their basic assumptions that traditional intrusion prevention systems, antivirus, and single-purpose sandbox appliances are up to the task of defeating advanced security threats, such as APTs.

To address this, new and improved techniques are needed to efficiently and effectively identify such new and evolving advanced threats. For example, by executing suspect files (e.g., malware samples) in a virtual environment (e.g., an instrumented virtual environment, which is sometimes also referred to as using a sandbox analysis of malware samples that can be instrumented with various user level and/or kernel level hooks for monitoring behaviors of programs executing and/or monitoring various network activities, which can be unknown threats) and observing their behavior, such malware can be quickly and accurately identified, even if the malware sample has not been previously analyzed and detected.

Once a file is deemed malicious (e.g., a malware sample is deemed to be malware), protections can be automatically generated using, for example, a cloud security service (e.g., implementing a dynamic security analysis of malware samples in a scalable cloud-based, virtual environment to directly observe the behavior of potentially malicious malware and exploits) to be delivered to subscribers of the cloud security service (e.g., within minutes or hours of detection). For example, such techniques can also be used to forensically determine who/what was targeted, including the application used in the delivery, any Uniform Resource Locator addresses (URLs) that were part of the attack, and/or other aspects (e.g., when an unknown threat is discovered, techniques disclosed herein can automatically generate protections to block the threat across the cyber kill-chain, sharing these updates with subscribers of the cloud security service within minutes or hours of detection, such that these quick updates can stop rapidly spreading malware, as well as identify and block the proliferation of potential future variants without any additional action or analysis). As disclosed herein, the cloud security service identifies unknown malware and zero-day exploits by directly executing them in a scalable cloud-based, virtual sandbox environment (e.g., an instrumented virtual environment (also referred to herein as a virtual machine (VM) environment), which are provided by commercially available cloud security services, such as WildFire offered by Palo Alto Networks, Inc., which provides for dynamic analysis to identify and block unknown threats). In one embodiment, the cloud security service automatically creates and disseminates protections in near real-time to help security teams meet the challenge of advanced security threats. In an example implementation, the cloud security service extends the next-generation firewall platform that natively classifies all traffic across many different applications, and the cloud security service can apply a behavioral analysis regardless of ports or encryption, including full visibility into web traffic, email protocols (SMTP, IMAP, POP), FTP, SMB, and/or other protocols to facilitate detection and dissemination protections in near real-time to respond to such advanced security threats.

However, existing techniques for using an instrumented virtual machine (VM) environment can be detected by a skilled attacker, because the attacker may be able to detect whether their malware is executing in the target host and/or target network environment or in a VM environment (e.g., sandbox for security analysis). For example, existing sandbox approaches to malware detection typically only install one version of software (e.g., applications or other software) per virtual machine instance. As another example, some other existing approaches execute multiple virtual machine (VM) instances with different software configurations (e.g., in which such multiple VM instances can be executed sequentially or simultaneously in a VM environment). Regardless, such approaches fail to synchronize various different attributes associated with a target host and the VM instance(s). Moreover, such approaches fail to emulate other devices in the VM environment, such as devices that the target host can communicate with in the target network environment (e.g., a network printer, a file share/server, a DNS server, an email server, a proxy server, other client devices, and/or other devices in the target network environment).

As such, current approaches to implementing VM environments for providing malware detection and security analysis generally perform analysis of discrete events (e.g., downloading of potential malware—a malware sample) and any subsequent activity in a stand-alone sandbox (e.g., in which a stand-alone sandbox is typically executing one or more VM instances using fixed configurations, which can be implemented using a cloud solution and/or appliance-based solution). For example, existing approaches only attempt to emulate a single host, which may be allowed to have external Internet access but do not allow for local network communications in the local target network. Further, such approaches typically only allow for a limited analysis time (e.g., 1 to 5 minutes of execution time using the VM instance executed in the instrumented VM environment), which fails to provide for a realistic environment. For example, APT attacks are usually over a longer period of time and performed by a more skilled attacker who would typically be attempting a targeted attack (e.g., directing malware and/or communications to a targeted host) such that such an attacker would often be able to detect that the VM instance does not have the previously observed and/or expected attributes associated with the target host. As another example, an attacker attempting an APT attack typically targets a host in a target network and, thus, expects to see other devices in a network environment that can be in communication with the target host (e.g., in some cases, based on prior reconnaissance of the target network environment by the attacker, such as based on logs and/or local configuration data on the target host and/or network scans of devices on the target network environment, such as using Nmap or other network scanning tools).

As a result, existing approaches to implementing VM environments for security analysis are insufficient to overcome various anti-VM techniques used by attackers or unauthorized users that can detect whether or not their malware is executing in a VM environment and/or whether their communications have been redirected from a target host to a VM instance in the VM environment. In particular, typical VM environments for security analysis fail to provide a realistic emulation of a target host and a target network environment that would be expected by skilled attackers, such as an attacker attempting to perform an APT attack on a target host in a target network environment (e.g., as such an attacker would typically have examined that host and target network environment to some extent in the past and, thus, would be able to compare such to the VM instance in the VM environment and likely be able to determine that such is not the actual target host in the target network environment and/or based on various attributes, such as configuration settings or logs that can be used by the attacker to infer the presence of a sandbox environment). Even if the VM instance in the VM environment is configured in a manner that can fool the attacker (e.g., such as by using a customized VM that has some attributes that may match the attributes of the target host), such would not be sufficient as the attacker would also be able to detect the lack of other devices that should be present in the target network environment. As a result, the attacker would typically not expose their full set of malicious tactics, techniques, and procedures (TTP) and/or would terminate their attack once the VM environment is detected or suspected. As a result, inadequate and insufficient competitive intelligence (e.g., adversary intelligence against such APT attacks and attackers) can be gained using existing approaches to implementing VM environments for security analysis.

An example APT attack pattern can be initiated by an attacker with a phish directed to a target user/target host, such that an exploit can be identified on the target host, and then a dropper can be used to install malware on the target host that can utilize the exploit to install a rootkit on the target host. At this point, the attacker can use various tools executed on the target host via remote control (e.g., C&C activities, in which the attacker is typically operating a device that is remote from the target host and remote from the target network environment). Such attacks can utilize a variety of phishing attacks and/or malware to attempt to avoid initial detection (e.g., evading firewall based on signatures and/or various other heuristics or other techniques that can be provided by perimeter and/or host-based security approaches). Also, as discussed above, existing, standalone VM environment approaches rarely would be able to observe an entire APT process (e.g., such as the above-described example APT attack pattern) as such are typically only executed in a VM environment for a short period of time (e.g., 1-5 minutes), and anti-VM techniques would often be used by APT attackers to determine that such is a VM environment (e.g., by detecting that the malware/rootkit is not executing on the target host and/or the device is not in the target network but rather in a standalone VM environment, such as a sandbox environment, as also discussed above).

Other existing approaches have attempted to use existing honeypot approaches, such as honeypot projects and commercial attempts that deploy honeypots using a virtual server(s) inside of an enterprise network. These honeypot approaches assume that whoever is knocking at the door is an attacker, which generally catches noisy unskilled, opportunistic attackers that scan the network and attempt to communicate with arbitrary hosts discovered during the scanning process. However, existing honeypot approaches are typically not effective against various advanced threats, such as APT attacks, because as similarly discussed above, skilled adversaries can generally detect when they are in a standalone VM environment (e.g., based on attributes of the VM instance executed in the VM environment) and/or are not in the actual target network environment (e.g., which should typically have other endpoints, such as other hosts including clients and servers, printers, and/or various other devices expected or known by the attacker to be present in the target network environment).

Thus, what are needed are new and improved virtual machine (VM) techniques for advanced security threats.

For example, techniques described herein can be used to provide more effective advanced threat prevention using an instrumented VM environment. In addition, techniques described herein can also facilitate competitive intelligence gathering of such advanced threats or other sophisticated attacker attacks using an instrumented VM environment.

Bridging a Honey Network to a Suspicious Device in a Network

Various techniques can be applied to determine that a device in an enterprise network has been compromised, such as using various firewall techniques as described herein. In some cases, monitoring activities including network related activities from a suspicious device (e.g., compromised host or other device) can facilitate competitive intelligence gathering, such as to glean tactics, techniques, and procedures (TTPs) used by an adversary (e.g., an attacker, such as an attacker using an APT or other attack).

However, monitoring such network activities from a suspicious device (e.g., as opposed to quarantining the suspicious device or cleaning any malware detected on the suspicious device) can put other production assets and data on the network at risk to such an attack (e.g., by allowing an attacker to communicate with and potentially access other devices on the enterprise network).

Thus, what are needed are techniques that can facilitate competitive intelligence gathering without such unmitigated risks to production assets and data on the network.

In some embodiments, techniques for bridging a honey network to a suspicious device in a network (e.g., an enterprise network) are disclosed.

For example, a honey network can be deployed in a public or private cloud that can be used for intelligence collection about an adversary (e.g., an attacker, such as an attacker using an APT) as further described herein. In some cases, a suspicious device can be a device in a network (e.g., an enterprise network), such as a host or another type of device, which is compromised (e.g., targeted by an APT attack or being used by an adversary/attacker to perform unauthorized activities on the device and/or the network). Bridging a honey network (e.g., a cloud-based honey network) to a suspicious device in a network (e.g., an enterprise network) can be implemented to detect and monitor adversary activities on the network to glean tactics, techniques, and patterns (TTPs) used by the adversary.

As such, these techniques facilitate gathering of competitive intelligence with respect to such adversary TTPs while eliminating and/or reducing (e.g., mitigating) the risk to production assets and data on the network. For example, these techniques can use the honey network as a decoy network around a suspicious host. In one embodiment, a firewall device (e.g., a firewall appliance or another firewall device, such as a network gateway firewall device) can blackhole the suspicious host in which any sessions originating from the suspicious host are redirected to the honey network (e.g., in which the honey network is provided as a decoy network around the suspicious/compromised host).

For example, a host can be determined to be suspicious (e.g., compromised or otherwise suspicious) based on a policy applied by a firewall device. The firewall device can then blackhole the suspicious host based on a policy. In some cases, a policy can be used to determine whether to blackhole a suspicious host using a honey network, which can be determined based on various criteria, such as availability of resources for a cloud-based honey network for the enterprise network, a type of malware associated with the suspicious host, and/or other criteria or resource aspects. If the suspicious host is blackholed, then any attempted connection to other devices (e.g., other hosts or other devices) within the network are instead transparently routed (e.g., using the firewall device and/or another network device) to the honey network (e.g., a public or private deployment of the cloud-based honey network). The honey network can be configured and executed using various techniques as further described below.

In one embodiment, one or more connections (e.g., network-based communications) from the suspicious device to devices that are outside of the network (e.g., devices that are in communication via the Internet, and are not devices that are members of the network, in this example, the enterprise network of which the suspicious device is a member) are routed without blocking or restrictions based on a policy (e.g., some or all of such external communications can be allowed based on a policy configured for the enterprise network). For example, any such external communications (e.g., communications between the suspicious device and any external devices) can be monitored and logged using the firewall device based on a policy (e.g., configured to monitor any such external communications to/from the suspicious device). As such, these techniques also facilitate gathering of competitive intelligence with respect to such adversary TTPs while eliminating and/or reducing the risk to production assets and data on the network.

In one embodiment, reports are automatically generated that indicate a summary of network activity observed from the suspicious device (e.g., compromised host). For example, the report can include information summarizing network activity observed from one or more compromised hosts as well as any activities performed on the virtual devices (e.g., decoy hosts and/or other virtual devices) of the honey network. In some cases, the report can classify various events based on the monitored network activity associated with each compromised host (e.g., classifying events based on a severity of the events).

In one embodiment, a severity of events can be assessed based on previous network traffic profiling of the compromised host in question. For example, any session to a decoy host that was never previously contacted by the compromised host in the actual enterprise network can be classified as a higher severity as further described herein.

Accordingly, various techniques for bridging a honey network to a suspicious device in a network (e.g., an enterprise network) are disclosed. In some embodiments, a system for bridging a honey network to a suspicious device in an enterprise network includes a device profile data store that includes a plurality of attributes of each of a plurality of devices in the target network environment; a virtual clone manager executed on a processor that instantiates a virtual clone of one or more devices in the target network environment based on one or more attributes for a target device in the device profile data store; and a honey network policy that is configured to route an internal network communication from a suspicious device in the target network environment to the virtual clone for the target device in the honey network. These and other embodiments for bridging a honey network to a suspicious device in an enterprise network will be further described below.

Integrating a Honey Network with a Real Target Network to Counter IP and Peer-Checking Evasion Techniques As similarly discussed above, a honey network can be deployed in a public or private cloud that can be used for intelligence collection about an adversary (e.g., an attacker, such as an attacker using an APT or other attack) as further described herein. In some cases, a suspicious device can be a device in a network (e.g., an enterprise network), such as a host or another type of device, which is compromised or otherwise suspicious (e.g., targeted by an APT attack or being used by an adversary/attacker to perform unauthorized activities on the device and/or the network).

However, as also discussed above, an adversary can determine if a session is executing in a virtual environment (e.g., a sandbox environment) based on what can be observed around the network, such as whether other hosts or other devices that are expected are present or not.

Thus, what are needed are techniques to avoid such detection by an adversary.

Accordingly, various techniques for integrating a honey network to a suspicious device in a network (e.g., an enterprise network) are disclosed. For example, these techniques can integrate a honey network with a real target network to counter IP and peer-checking evasions techniques.

In one embodiment, a honey network is configured to route any session attempt to a device (e.g., a host or other device of the enterprise network) that does not exist in the honey network (e.g., for which a virtual clone has not been instantiated in the honey network) back to the enterprise network to then be routed to that actual device in the real target enterprise network or to the Internet for external communications (e.g., to devices that are external to the enterprise network). For example, such routing can be determined based on a policy (e.g., a honey network policy for the enterprise network, such as further discussed below).

For example, if an attacker lands on a virtual device (e.g., virtual clone or high interaction honeypot system) within the honey network through any of the mechanisms described herein (e.g., using network communications from a compromised host that are redirected to the honey network), then the attack may attempt to determine what other devices are reachable (e.g., other hosts, domain controller, print server, Internet, and/or other devices internal and/or external to the enterprise network). In this example, an attempted communication (e.g., session) to a device that is not cloned in the honey network (e.g., for which a virtual clone has not been instantiated in the honey network), or any device outside of the enterprise network (e.g., external devices) can be routed from the honey network to that device or to the Internet for external communications (e.g., to devices that are external to the enterprise network). In one embodiment, such external communications that are routed back from the honey network are routed back through the firewall device (e.g., network gateway firewall device or appliance) of the enterprise network, and then routed to the external device. In particular, routing such communications back through the firewall device (e.g., network gateway firewall device or appliance) of the enterprise network ensures that such network communications are from the IP address assigned to the firewall device (e.g., network gateway firewall device or appliance) of the enterprise network. As a result, the attacker would not be able to detect that such communications were really from the honey network and not an actual device residing in the enterprise network. As a result, this can prevent an adversary from determining that a session is executing in a virtual environment (e.g., a sandbox environment) of the honey network.

Accordingly, various techniques for integrating a honey network to a suspicious device in a network (e.g., an enterprise network) are disclosed. In some embodiments, a system for integrating a honey network with a target network environment includes a device profile data store that includes a plurality of attributes of each of a plurality of devices in the target network environment; a virtual clone manager executed on a processor that instantiates a virtual clone of one or more devices in the target network environment based on one or more attributes for a target device in the device profile data store; and a honey network policy that is configured to route an external network communication from the virtual clone for the target device in the honey network to an external device through the target network environment.

As further described herein, the honey network can be implemented to facilitate more effective advanced threat prevention using an instrumented VM environment. In addition, these techniques described herein can also facilitate competitive intelligence gathering of such advanced threats or other sophisticated attacker attacks by monitoring attacker activities using the honey network implemented in an instrumented VM environment.

As used herein, a honey network generally refers to a virtual emulation of a plurality of devices in communication with a target network. In an example implementation, the honey network can include a virtual clone of one or more of the actual devices to mirror and synchronize various attributes of each of such corresponding actual devices (e.g., such attributes can include IP address, OSs (including version and patch level), application software (including versions and patch level), various configuration settings, and/or various other attributes). For example, a honey network can be generated to emulate a target enterprise network or other computer network that can include a variety of devices, such as servers, appliances, desktop computers, mobile computers including laptops, tablets, smart phones, printers, networking devices including routers, and/or various other devices capable of wireless or wired-based network communications, which can provide various services in communication over the network. In some cases, all or a subset of devices of the target network can be emulated to support high-level interactions, in which a configuration of each of such emulated devices can be implemented to facilitate a virtual clone of such devices, such as further described below. In some cases, a subset of devices of the target network can be emulated to support low-level interactions, in which a configuration of each of such emulated devices can be accurately represented in response to one or more types of probes used by network scanning tools, such as further described below (e.g., Nmap and/or other network scanning tools that send various probes to attempt to determine device type, operating system type and version, and/or various services offered by a device, such as services associated with an open port of the device in communication with the network). In an example implementation, one or more of the emulated devices initially implemented to merely support low-level interactions can be implemented as virtual clones of the corresponding target devices to support high-level interactions by, for example, launching new VM instances in the instrumented VM environment to implement a virtual clone of each of such devices, or vice versa, virtual clones of one or more of the emulated devices can be downgraded to only support low-level interactions (e.g., in which such transitions can be performed on demand, as needed, based on resource availability, and/or based on other criteria).

Techniques described herein can be used to analyze malware (e.g., a malware sample) in a honey network that can emulate, for example, a target device, such as a target host, in a target network environment that provides for more realistic interactions with a clone of the target device and its relevant target network environment. As a result, this makes it much more difficult for an attacker to detect that the malware is being executed in a virtual sandbox environment instead of on the actual target host in the target network environment. In an example implementation, the cloned target device and, in some cases, a subset of devices in the target network are implemented as VM instances in the honey network to facilitate a high fidelity VM environment that emulates the target host and the subset of devices in the target network (e.g., the devices are implemented as VM instances that can support high-level interactions to facilitate realistic interactions with an attacker and/or malware executed on such VM instances that clone an actual target device, as opposed to only supporting low-level interactions, such as providing (minimal) responses to respond to network scans, such as an Nmap scan). Each cloned device can be implemented as a VM instance that can be configured (e.g., dynamically configured, such as by customizing a base VM image) to clone the respective target device, such as further disclosed herein. In some cases, another device can be added to the honey network on demand to support expected or requested interactions from the cloned target host and/or other devices in the honey network, such as further disclosed herein.

As an example use case scenario, a user, Alice, is an employee of ACME Company and has a device, such as a laptop or other computing device, in which the device is a member of ACME's enterprise network (e.g., is configured to access the ACME enterprise network, that is, Alice's device is in communication with the ACME Company enterprise network, at least for some period of time or periodically). Assume that a malware (e.g., potentially malicious content, such as a download during a web session or an attachment to an email, or a link in a web page, email, and/or file, etc.) is directed to Alice's device. For example, a web session from Alice's computer can be monitored using a data appliance (e.g., that includes a firewall, such as described above) in which a malware URL or malware content is detected using the data appliance (e.g., or other security device). In either case, assume that the malware directed to Alice's host device has been detected. As another example, the data appliance (e.g., or other security device) on the ACME enterprise network detects that an email directed to Alice includes malware (e.g., a malware URL in the content of the email and/or a malware attachment to the email). In either use case scenario, Alice's device is determined to be suspicious (e.g., compromised by malware directed to Alice's device). As such, various clones can be instantiated in the honey network, such as by being instantiated as a customized VM instance in a VM environment (e.g., instrumented VM environment) for emulating a subset of devices from the target network environment (e.g., email server, DNS server, printer, etc.) in the VM environment (e.g., using a cloud security service or on a data appliance deployed on the target network environment) that are in communication with Alice's device (e.g., based on logs and/or configuration data to identify devices that may be targeted by an attacker using Alice's compromised device to attempt to access other devices on the enterprise network). In particular, the VM environment can be configured to automatically synchronize with relevant portions of the target network (e.g., network layout, IP addresses, customized host images, etc.) to implement a honey network for the target network (e.g., using high-interaction virtual clones and/or low interaction virtual devices as further described below). Based on a policy (e.g., a honey network policy for routing communications to/from a suspicious/compromised device on the enterprise network, which can be executed using a firewall device), communications from Alice's compromised device can be routed to the VM environment to interact with virtual devices (e.g., high-interaction virtual clones and/or low interaction virtual devices as further described below) executed in the honey network environment that implements the above-described honey network emulation (a subset) of the ACME enterprise network. As further described below, various techniques are also disclosed for bridging the target network with the honey network in dynamic and intelligent ways. The behavior of the malware and any subsequent activities and/or network interactions with other devices emulated in the honey network implemented in the VM environment and/or, in some cases, external network activities, such as over the Internet and/or with other devices on the actual target network, can also be monitored and logged to gain competitive analysis and to facilitate advanced threat prevention, as further described below.

In particular, techniques described herein can be used to provide improved competitive analysis of various advanced threat attacks (e.g., APT and/or other advanced threat attacks). For example, these techniques can provide insight into the advanced stages for advanced threat attacks that cannot be observed in the short period of time that would typically be allocated for a VM analysis using existing approaches. As such, these techniques can also provide critical threat research and reliable detection for advanced threat attack prevention. For example, collection and analysis of rootkits, end-game tools, and exfiltration techniques can be important to advanced threat research and timely alerting (e.g., advanced threats can then be monitored in real-time by a threat/security analyst).

Also, a new level of targeted threat intelligence can be delivered to customers of a security service that implements these techniques. As an example, in addition to a report that delivers hashes, domains, IPs, network activities (e.g., a network log/report, such as using packet capture (pcap) logging for capturing network traffic) within a single sandbox session, a broader view (e.g., trace) of a compromise at the network level can be included in the report.

Further, such threat intelligence can provide indicators that can be used by a data appliance implementing a firewall or other security device to provide for future prevention of such advance threat attacks. For example, extracting indicators and automatically identifying malware and exploitation can be performed to identify new malware IPs, new malware domains, new malware URLs, new malware network signatures, and/or other indicators that can be used to implement prevention at a firewall or other security device.

Accordingly, various techniques for synchronizing a honey network configuration to reflect a target network environment are disclosed. For example, using such techniques can facilitate an enhanced detection of advanced threats using an instrumented virtual machine (VM) environment. As will be apparent to one skilled in the art in view of the various techniques and embodiments described herein, while the various techniques described herein for synchronizing a honey network configuration to reflect a target network environment are described with respect to VM environments using a security service (e.g., a cloud security service), such techniques can similarly be applied to various other security environments, including, for example, performed in part or completely using security devices such as appliances, gateways, servers, and/or other security platforms capable of implementing various virtual environment techniques disclosed herein.

Overview of an Architecture for Performing a Dynamic Analysis of Advanced Threats FIG. 1 is a diagram of an architecture for performing a dynamic analysis of advanced threats in accordance with some embodiments. For example, such an environment can be implemented to provide a honey network in which a suspicious device can be bridged with the honey network in dynamic and intelligent ways. In some cases, a suspicious device (e.g., a compromised device) can be a device on a target network (e.g., an enterprise network) that is determined to be infected with potential or known malware (e.g., in which malware generally refers to various forms of malicious software, links to malicious software, etc., which can be embedded with a file, email, attachment to an email, web page, web download file, linked to a resource that includes the malicious software, and/or using various other delivery and distribution mechanisms). Specifically, the malware can be associated with various types of advanced threats, such as APTs or other advanced threats (e.g., malicious software can include any malicious computer code or executable program, such as active content, executable code, and scripts, that can interfere with operation of a computing device or computer network, attempt unauthorized access of data or components of a computing device, and/or perform various other malicious, unauthorized, and/or undesirable activities). More specifically, a variety of attempts by an unauthorized person (e.g., an attacker) to attempt to deliver malware to an enterprise network 110, which can then be used to target devices on the enterprise network in order to, for example, propagate malware (e.g., malware 130) via system 120 (e.g., any type of computing device) and/or to perform various other unauthorized/undesirable actions are described, as are techniques for performing a dynamic analysis for advanced threats.

In the example shown in FIG. 1, various devices 104-108, shown as a laptop computer 104, a desktop computer 105, a tablet or smart phone 106, a server 107, and a printer 108, are present in enterprise network 110. Data appliance 102 is configured to enforce policies regarding communications between devices, such as client devices 104-106 as well as other devices, such as servers (e.g., server 107) and printers (e.g., printer 108), etc., and nodes outside of enterprise network 110 (e.g., reachable via external network 118, such as the Internet). Examples of such policies include policies (e.g., which can include various rules) for governing traffic shaping, quality of service, and/or routing of traffic. Other examples of policies include security policies such as policies for scanning for threats in incoming and/or outgoing email attachments, website downloads, files exchanged through instant messaging programs, and/or other file transfers and/or intra-networking and inter-networking related data communications. In some embodiments, appliance 102 is also configured to enforce policies with respect to traffic that stays within enterprise network 110 (e.g., intra-networking related data communications).

Appliance 102 can take a variety of forms. For example, appliance 102 can be a dedicated device or set of devices. The components of appliance 102 can also be integrated into or executed as software on a general purpose computer, a computer server, a gateway, and/or a network/routing device. As an example implementation, an architecture for such a data appliance is further described below with respect to FIG. 2.

As will be described in more detail below, appliance 102 can be configured to work in cooperation with one or more virtual machine servers (112, 124) to perform various techniques for performing a dynamic analysis for advanced threats as disclosed herein. As one example, data appliance 102 can be configured to communicate with VM server 112, and VM server 112 can be configured to execute a virtual machine environment for performing a dynamic analysis for advanced threats as further described herein. As another example, appliance 102 can be in (secure) communication with a cloud security service 122, which includes VM server 124, and VM server 124 can be configured to perform a dynamic analysis for advanced threats as further described herein. For example, one or more devices of enterprise network 110 can be emulated in a honey network implemented using the VM environment (e.g., executing one or more VM instances 114 and 116 on VM server 112 and/or executing one or more VM instances 126 and 128 on VM server 124) such that communications from a target device in enterprise network 110 can be routed to the VM environment for bridging the target network with the honey network in dynamic and intelligent ways using various techniques disclosed herein.

An example of a virtual machine server is a computing device that can execute virtualization software, such as commercially available server-class hardware (e.g., a multi-core processor such as a dual 6-core Intel® processor with Hyper-Threading, four or more Gigabytes of RAM such as a 128 GB RAM, a system disk such as a 120 GB SSD, and one or more Gigabit network interface adapters). Such a virtual machine server can be configured to execute commercially available virtualization software, such as VMware ESXi, Citrix XenServer, or Microsoft Hyper-V (e.g., such a VM environment can emulate the Windows® XP operating system environment using the dual 6-core Intel® processor with Hyper-Threading and 512 MB of RAM, the Windows® 7 operating system environment using the dual 6-core Intel® processor with Hyper-Threading and 1 GB of RAM, and/or other operating system environments and/or using different hardware capacity/components). The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party service 122). In some embodiments, data appliance 102 is configured to use one or the other of virtual machine servers 112 and 124 for performing a dynamic analysis for advanced threats. In other embodiments, data appliance 102 is configured to use the services of both servers (and/or additional servers not shown). Thus, in some implementations, the cloud security service can be delivered either as a public cloud or as a private cloud (e.g., deployed locally on an enterprise network using a locally deployed data appliance, server, or other computing device that executes the virtual machine (VM) environment).

In some embodiments, the virtual machine server 124 is configured to implement various emulation-based techniques performing a dynamic analysis for advanced threats as described herein with respect to various embodiments (e.g., implemented using instrumented VM environments, which can include one or more VM instances, executed by cloud security service 122 and/or malware analysis system 132, such as further described below with respect to FIGS. 2 through 11, and with respect to various other embodiments disclosed herein). For example, the virtual machine server 124 can provide an instrumented virtual machine environment capable of performing the various techniques as described herein. These instrumented virtual machine (VM) environments, which can include one or more VM instances (126 and 128), can include, for example, various network activity logging, user level hooks, and/or kernel level hooks in the emulated execution environment to facilitate the monitoring of various network and/or program related activities and/or behaviors during emulation using the virtual environment (e.g., instrumented VM environments, such as described above) and to log such monitored activities and/or behaviors for analysis based on the various techniques described herein with respect to various embodiments.

Example Data Appliance Hardware Environment

Figure 2:
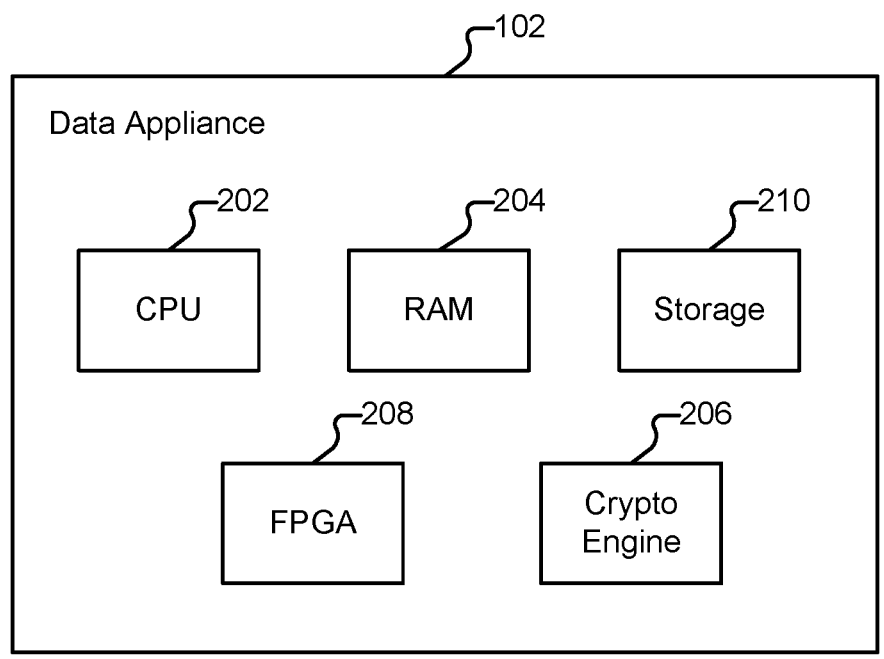
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy (e.g., layer-3 through layer-7 firewall and/or routing rules, such as destination IP-based routing rules, firewall rules, etc.) and other configuration information. Data appliance 102 can also include one or more optional hardware accelerators. For example, data appliance 102 can include a cryptographic (crypto) engine 206 that can perform encryption and decryption operations, and one or more FPGAs 208 that can perform matching, act as network processors, and/or perform other tasks.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

In one embodiment, data appliance 102 can perform routing of traffic (e.g., based on layer-3 destination IP-based routing rules and/or based on other rules, including layer-3 through layer-7 filtering and routing rules) to route certain traffic to a VM server (e.g., based on a policy implemented by the data appliance, certain traffic from a compromised device that is directed to one of the emulated devices, such as a virtual clone, in a honey network can be routed to the appropriate VM instance executed on a VM server that is implementing the honey network to bridge the target network with the honey network in dynamic and intelligent ways). For example, the VM server can be a local VM server (e.g., VM server 112) or a remote VM server (e.g., VM server 124 of cloud security service 122). In an example implementation, if the VM server is configured as a remote VM server (e.g., VM server 124 of cloud security service 122), then data appliance 102 can provide for secure routing of such traffic communications with another data appliance at cloud security service 122 using a secure protocol (e.g., via a VPN, using Internet Protocol Security (IPsec) or another secure protocol) over Internet 118. These and other techniques for performing a dynamic analysis for advanced threats are further described below with respect to FIG. 3.

Figure 3:
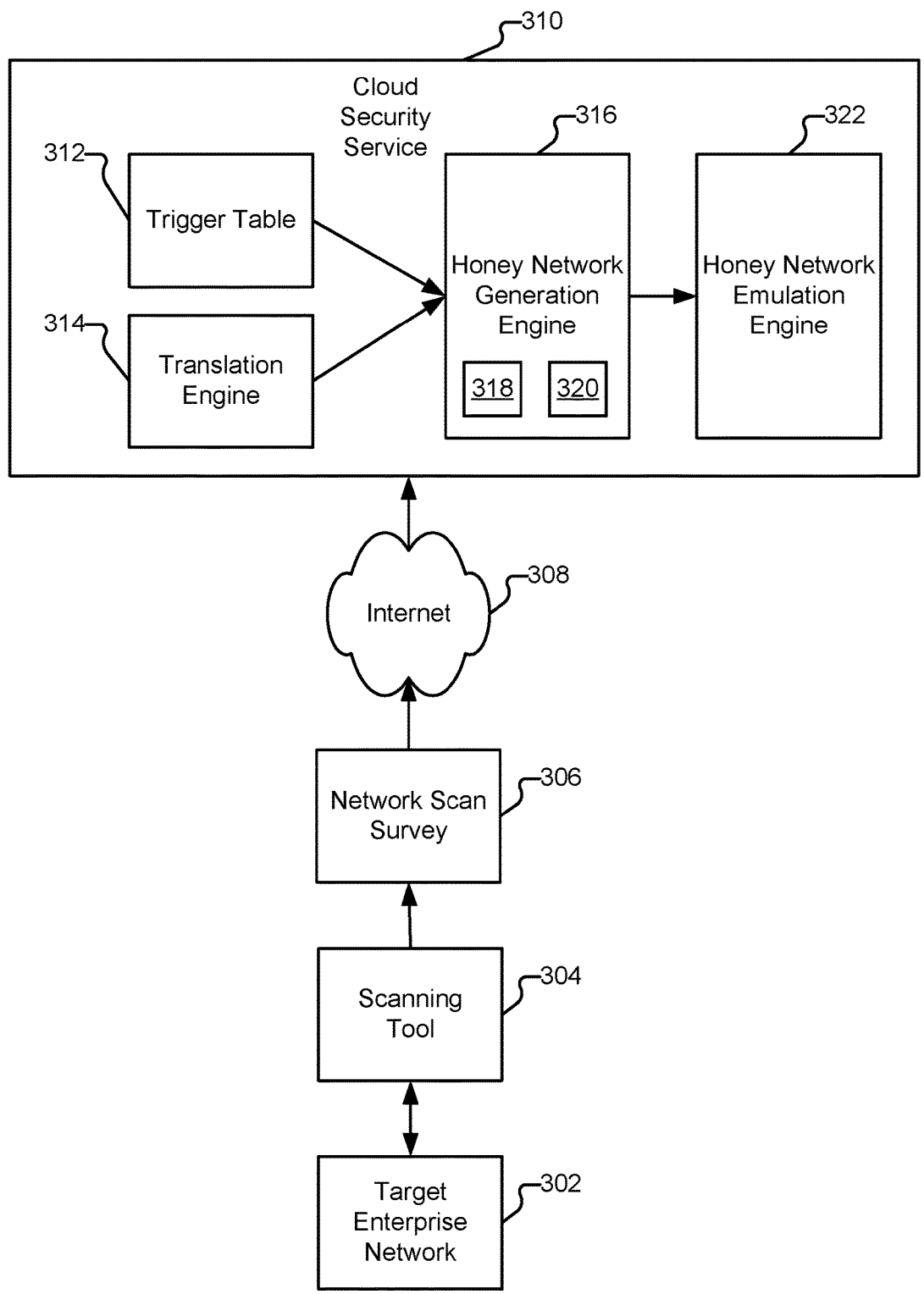
FIG. 3 is a block diagram illustrating techniques for generating a honey network configuration to emulate a target network environment to send responses to network scans that correspond to responses that would be sent by actual devices in accordance with some embodiments.
Figure 4:
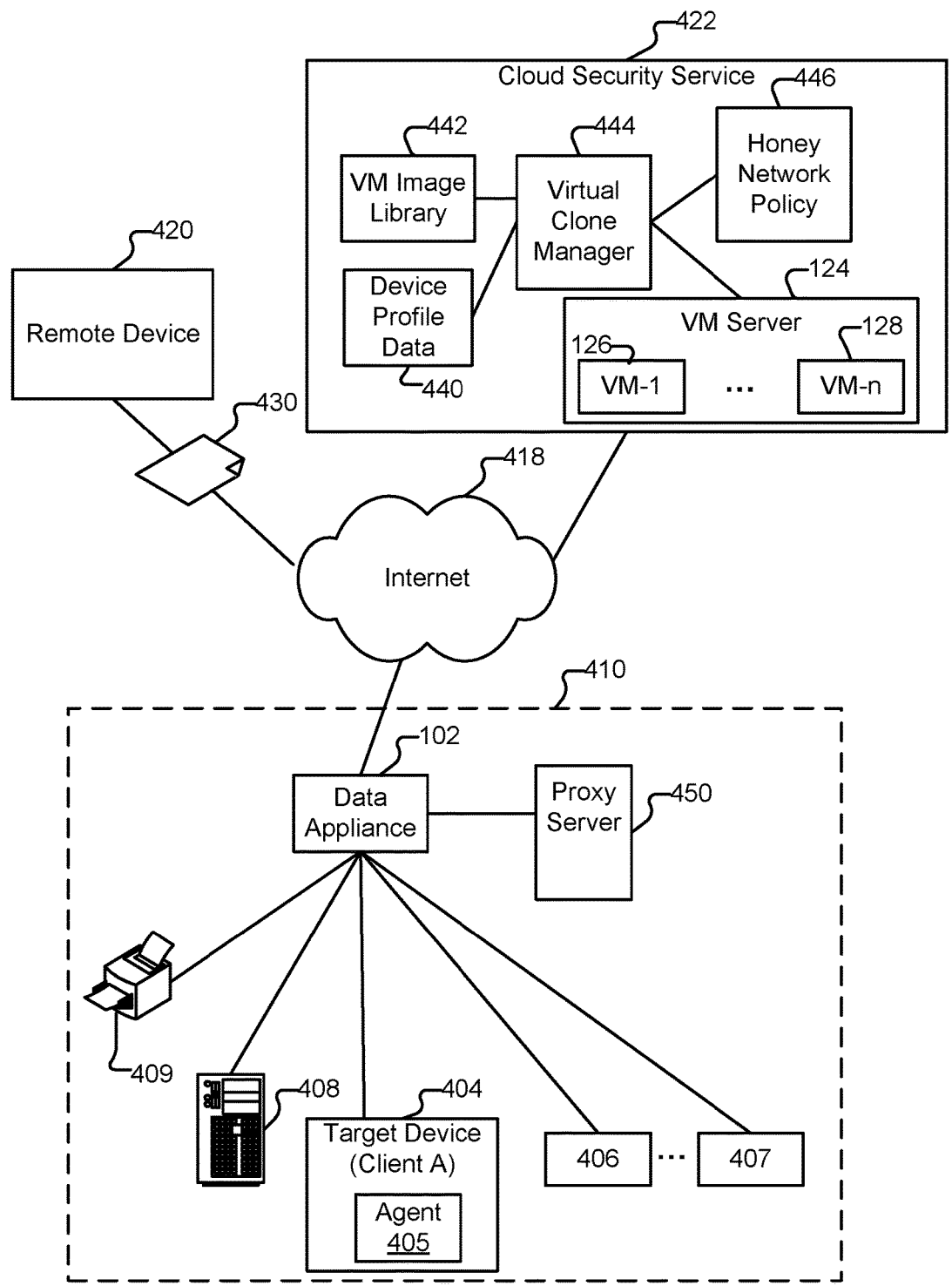
FIG. 4 is a block diagram illustrating techniques for synchronizing a honey network configuration to reflect a target network environment to implement a virtual clone of one or more target devices in accordance with some embodiments.

Techniques for Generating a Honey Network Configuration to Emulate a Target Network Environment to Send Responses to Network Scans that Correspond to Responses that would be Sent by Actual Devices FIG. 3 is a block diagram illustrating techniques for generating a honey network configuration to emulate a target network environment to send responses to network scans that correspond to responses that would be sent by actual devices in accordance with some embodiments. In an example implementation, generation of a honey network configuration to emulate a target network environment (e.g., to send responses to network scans that correspond to responses that would be sent by actual devices to provide a lightweight honey network implementation for one or more emulated devices of the target network) can be performed on an appliance or a computing device that is locally connected to or in local network communication with the target enterprise network (e.g., performed using a device that is also a member of the target enterprise network). In another example implementation, generation of a honey network configuration to emulate a target network environment can be performed using a cloud security service, such as shown in FIG. 4 and further described below.

As shown, a target enterprise network 302 is scanned using scanning tool 304 to generate results of various scanning operations, which is provided in an output result that is generally referred to as a network scan survey 306. For example, a scanning tool, such as Nmap or another commercially available scanning tool (e.g., such as scanning tools available from Metasploit®, Rapid 7, hping, Scapy, and/or other commercially available, open source, and freeware tools) can be used to perform a scan of devices on the target enterprise network to generate the network scan survey. The network scan survey can be provided to a cloud security service 310 (e.g., using a secure communication protocol, such as Internet Protocol Security (IPsec) or another secure protocol) over Internet 308.

As also shown, cloud security service 310 includes a trigger table 312 and a translation engine 314. Translation engine 314 translates network scan survey 306 (e.g., an XML or another format of the network scan survey) into a data representation (e.g., data in a specified format or data structure) that can be processed by honey network generation engine 316. Trigger table 312 represents a set of data that indicates responses to a given scanning tool's probes that are expected to generate a particular result, such as responses that can be used by the scanning tool to identify a device type, an operating system type and version, and/or services provided by the device. In one embodiment, the trigger table is provided for each scanning tool as a commercially available trigger table for the scanning system. In one embodiment, the trigger table is generated by automatically parsing publicly available source code for the scanning system (e.g., parsing one or more triggers that are used to generate each fingerprint for each device, service, and attributes that can be processed and reported based on probes sent and probe responses received by the scanning system, such as Nmap and/or other open source scanning tools, in which the parsing of such Nmap/other scanning tool's source code can be performed for each new version/release of that scanning tool to generate a trigger table for each new version/release of that scanning tool).

Cloud security service 310 also includes honey network generation engine 316 to generate a honey network configuration based on the input received from trigger table 312 and translation engine 314 to emulate target enterprise network 302 (e.g., to facilitate an implementation that can send responses to network scans, such as probe packets, that correspond to responses that would be sent by actual devices). In one embodiment, honey network generation engine 316 automatically generates a systems table 318 and a services table 320. For example, systems table 318 can include entries for each device to be emulated in the honey network. In some cases, an entry for a given emulated device can include an IP address assigned to the emulated device, a device type identification, an operating system (OS) type and version (as applicable or if available from the translated network scan survey). As another example, services table 320 can include entries for each service to be emulated in the honey network. In some cases, an entry for a given emulated service can include an IP address associated with the emulated service, a port number, and a service type identification (as applicable or if available from the translated network scan survey). In one embodiment, honey network generation engine 316 also processes trigger table 312 to include probe responses for each emulated system in the systems table and for each emulated service in the services table with responses to provide to specific probes received from a scanning tool in order to provide responses that would be processed by the scanning tool to properly identify the emulated system and/or emulated service. For example, entries in each table (e.g., the systems table and the services table) can be updated to include such responses to be provided in response to each particular probe. In another embodiment, the appropriate/expected probe responses for each emulated system can be determined at run-time by honey network emulation engine 322 (e.g., during execution in a VM instance when probes are received by the honey network) using trigger table 312 as well as systems table 318 and/or services table 320.

Cloud security service 310 also includes honey network emulation engine 322 to emulate a honey network configuration based on the output received from honey network generation engine 316 to emulate target enterprise network 302 (e.g., to facilitate an implementation that can send network scan responses that correspond to responses that would be sent by actual devices to provide a lightweight honey network implementation for one or more emulated devices of the target network). In one embodiment, honey network emulation engine 322 is executed on a processor as a virtual machine (VM) instance in a virtual machine (VM) environment to emulate devices and/or services of the target enterprise network based on systems table 318 and services table 320. For example, honey network emulation engine 322 can be implemented to respond to a scanning tool's probes using the systems table and the services table (e.g., and, in some implementations, using the trigger table at run-time, such as described above) to provide appropriate responses to each probe from a network scanning tool. In an example implementation, the honey network emulation engine can be executed in a VM environment on a processor, such as a laptop, desktop, appliance, server, or another computing device, such as described above.

For example, the honey network emulation engine can be used to emulate a set of devices and services of a target enterprise network to emulate the virtual existence of such devices and services to provide a realistic view of such devices and services that can be replicated in the honey network. In particular, this approach does not require that these devices and services need to be fully emulated, which would typically require more heavyweight processing requirements in a VM environment. Rather, this approach facilitates a realistic emulation from a perspective of a network scanning tool that may be performed by an attacker or other unauthorized user (e.g., performing network scans, such as from a compromised device on a target network) attempting to identify devices and services on the target network (e.g., based on a policy, communications from the compromised device that are directed to one or more devices represented by a honey network using the above-described techniques can be routed to the VM server that is implementing the honey network to bridge the target network with the honey network in dynamic and intelligent ways as further described below). As a result, devices and services in the honey network can appear to an attacker or other unauthorized user, based on a network scan survey (e.g., Nmap scan results or other scanning tool results), to be part of an enterprise's actual network (e.g., to be actual, physical devices and/or actual, active services, etc.). As such, probe responses provided by the honey network emulation engine are generated and sent in order to fool the network scanning tool into determining that an emulated device, IP address, and/or services are present in the honey network (e.g., particular devices with various attributes, IP address, OS type and version, and/or services on certain ports are present based on the probe responses received by the network scanning tool from the honey network emulation engine).

In some cases, this lightweight honey network approach can be used for one or more of the devices in the target network for which there is not, for example, a locally executed agent that can provide more granular attribute information regarding the device (e.g., a printer, router, or other device) (note that various local agent use case scenarios are discussed below with respect to various embodiments described with respect to FIG. 4). In some cases, this lightweight honey network approach can be used for one or more of the devices in the target network for which a virtual clone is not yet configured and/or instantiated (e.g., based on resources, demand, and/or based on various other criteria that can be included in a honey network policy, such as described herein), and, in some use cases as mentioned above, the lightweight emulation of a particular device can be transitioned to using a virtual clone to emulate the target device in the honey network (e.g., or vice versa, that is, a virtual clone emulation of a target device in the honey network can be downgraded to a lightweight emulation of that particular device, such as based on various policies or requirements, such as to reduce computing resource requirements and/or based on a lack of demand for high interactions with that particular device emulated in the honey network).

In one embodiment, the honey network emulation engine responds to various packets that are directed to the honey network (e.g., responding to probes received from Nmap scans and/or other network scanning tools) to provide responses (e.g., to send certain packets and/or to not send any packets) that would be interpreted by such security scan tool(s) to report the emulated device and services representation for each IP address in the honey network. For example, Nmap is a network scanning tool that can report hundreds or possibly thousands of different services, so there are many variations that can exist and be reported based on an Nmap network scan of a given target network. As such, the honey network emulation engine can be configured to be able to generate robust and diverse sets of devices (e.g., using different systems tables and services tables) to provide responses to different Nmap probes to indicate that certain IPs exist and are associated with certain attributes (e.g., system type, OS type and versions, application type and versions, ports and running services, etc.) to facilitate emulation of variations that can exist between different enterprise networks to be emulated in whole or in part as a virtual representation of such target enterprise networks, which is more likely to also not be easily detected as a virtual copy of the target enterprise network by an attacker using various network scans to survey the target enterprise network.

As an example use case scenario, a network admin or security admin of the enterprise network or a third party security provider can perform a network scan (e.g., using a network scanning tool, such as Nmap or other network scanning tools) to scan a portion or all of their enterprise network. The results of the network scan, the network scan survey, can then be imported and processed by the translation engine to facilitate a generation of a honey network configuration to emulate the devices and services identified in the network scan survey. For instance, an Nmap survey (e.g., Nmap scan report of (a portion of) the target enterprise network, which can include desktops, servers, printers, appliances, mobile devices, etc., which can be associated with certain attributes, including open ports and active services, etc.) can be used to generate an automated copy of the scanned network based on that ingested Nmap survey to generate a honey network representation of such scanned devices and services using the techniques described herein.

In an example implementation, the honey network can be configured to replicate the IP addresses of the devices in the target network. Using this approach, if a attacker's activities are routed from a target device in a target enterprise network to a virtual clone of the target device implemented in a honey network in a VM environment, and if the attacker then attempts to probe the surrounding network using a network scanning tool (e.g., Nmap), the honey network implementation would be able to provide appropriate/expected responses to such probes even for other devices in the honey network that are not (yet) instantiated as virtual clones but which are emulated using the above-described lightweight honey network techniques. This approach can avoid easy detection by the attacker of the VM environment as the network scan results received by the attacker's network scanning tool operations would indicate the existence of devices and their associated IP addresses (e.g., as well as other attributes that can be identified using such network scanning tools) that match results that the attacker may have previously collected while performing similar scanning operations when on the actual target device in the actual target network environment.

In another example implementation, the honey network can emulate the devices and services identified in the network scan survey of the target enterprise network using different assigned IP addresses to be associated with the emulated devices and services. As an example, such different IP addresses can be IP addresses selected from an additional subnet IP address space of the enterprise target network. This approach of using different IP addresses can avoid potential conflicts with IP addresses of existing, real systems and services of the target enterprise network (e.g., to avoid confusion or errors that could arise if legitimate users or services attempted to communicate with such virtual devices and virtual services in the IP subnet associated with the honey network). As a result, if an attacker identifies the existence of the subnet of IP addresses that are actually associated with the honey network, then the attacker would potentially attempt to scan one or more IP addresses that are actually associated with the emulated honey network. This allows for such illegitimate attacker probing and other activities in the honey network to be logged and monitored, such as by the cloud security service. As discussed above, the emulated honey network is configured to respond to any such illegitimate attacker probing by providing expected responses that would make it very difficult for the attacker to be able to distinguish the emulated honey network from the actual physical network of the target enterprise network (e.g., as the only differences that would be evident based on network scans would just be different IP addresses associated with the virtual and the physical devices and services).

In another example implementation, the honey network can be configured to replicate the IP addresses of one or more of the devices in the target network (e.g., in addition to the virtual clones of one or more target devices that can be associated with the same IP addresses in the emulated honey network as their corresponding actual devices in the actual target network) and can also be configured to emulate one or more of the devices and services identified in the network scan survey of the target enterprise network using different assigned IP addresses to be associated with the emulated devices and services. The hybrid IP address mapping approach can provide for a more diverse honey network environment that can replicate IP addresses, for example, for a subset of devices to which one or more virtual cloned target devices had recent communications with or are configured to communicate with (e.g., a target device's configured network printer(s), email server, DNS server, proxy server, and/or other devices that an attacker is more likely to expect, to probe, and/or to be able to detect a different IP address assignment as a discrepancy that may be inferred as a VM environment indicator to the attacker), but for other devices in the enterprise network, the actual IP addresses are not replicated to minimize the risks of using the same IP addresses when such may be unnecessary, such as discussed above (e.g., and the attacker may be less likely to notice any such IP discrepancy to such other devices).

In one embodiment, an Nmap survey (e.g., an XML formatted document that is generally intended for human readable consumption) is translated by the translation engine to be in a data representation that can be processed by the honey network generation engine (e.g., using a script(s) and/or a computer program(s) executed on a processor to parse and process the Nmap survey in order to translate the Nmap survey into another data representation that can be processed by the honey network generation engine). In an example implementation, the translation engine can also map each actual IP address value of each device detected in the Nmap survey results of the target enterprise network to a target IP address in the IP address space associated with the honey network. In some cases, for each device with an actual $IP_x$ value in the target enterprise network based on the Nmap survey, results can be mapped to a new target $IP_y$ value with the same associated attributes (e.g., device type, OS type and version, application type and version, open port numbers, services on such open ports, etc.) to include in the honey network to be generated.

In one embodiment, a services table is generated by the honey network generation engine. In an example implementation, a key for each service can be generated using the assigned new target IP address value (e.g., $IP_y$) and using the port number (e.g., the port number associated with a given service, such as Apache version 2 (v2) or another service, in which the port number is extracted from the Nmap survey results). As a result, the key is uniquely associated with the emulated service in the services table (e.g., based on its assigned IP address and port number), which also facilitates efficient lookup operations for the emulated service using the services table.

In one embodiment, a systems table is generated by the honey network generation engine. As an example, the systems table can be generated using an array for each target IP address value (e.g., $IP_y$) for the emulated system. In some cases, the array for $IP_y$ can be initialized with certain default values that can subsequently be updated based on the trigger table (e.g., a default TTL, ARP response, ICMP ECHO can be initialized with zeroes if Nmap survey results do not provide data for such values). If certain values for some of these attributes are present from the parsed Nmap survey results, then such values can be populated accordingly in the systems table by the honey network generation engine.

In one embodiment, the honey network generation engine is implemented as a single lightweight process, in which these engines and modules can be implemented using executable programs (e.g., using Python code, Java code, and/or other programming languages). In an example implementation, the honey network generation engine can be executed using commercially available personal computing (PC) hardware and/or using more powerful hardware, such as described above.

Whenever cloud security service 310 is described as performing a task, a single component, a subset of components, or all components of cloud security service 310 may cooperate to perform the task. Similarly, whenever a component of cloud security service 310 is described as performing a task, a subcomponent may perform the task and/or the component may perform the task in conjunction with other components. In various embodiments, additional logical components/features can be added to cloud security service 310 as applicable.

As described above with respect to FIG. 3, a network scan survey (e.g., an Nmap survey or other network scanning tool's survey) can be used as input to generate a honey network configuration to emulate a subset of or an entire target enterprise network. The honey network can be emulated using a honey network VM instance executed in a virtual environment that is configured to respond to network scan probes (e.g., from an attacker or other unauthorized network scanning activity) in order to emulate the target enterprise network using the honey network configuration. In some embodiments, one or more of the target devices can be cloned to generate a virtual clone of such target devices in the honey network, in which such virtual clones are implemented to provide a high-fidelity (e.g., high interaction) VM instance of such target devices, as further described below with respect to FIG. 4.

Figure 6:
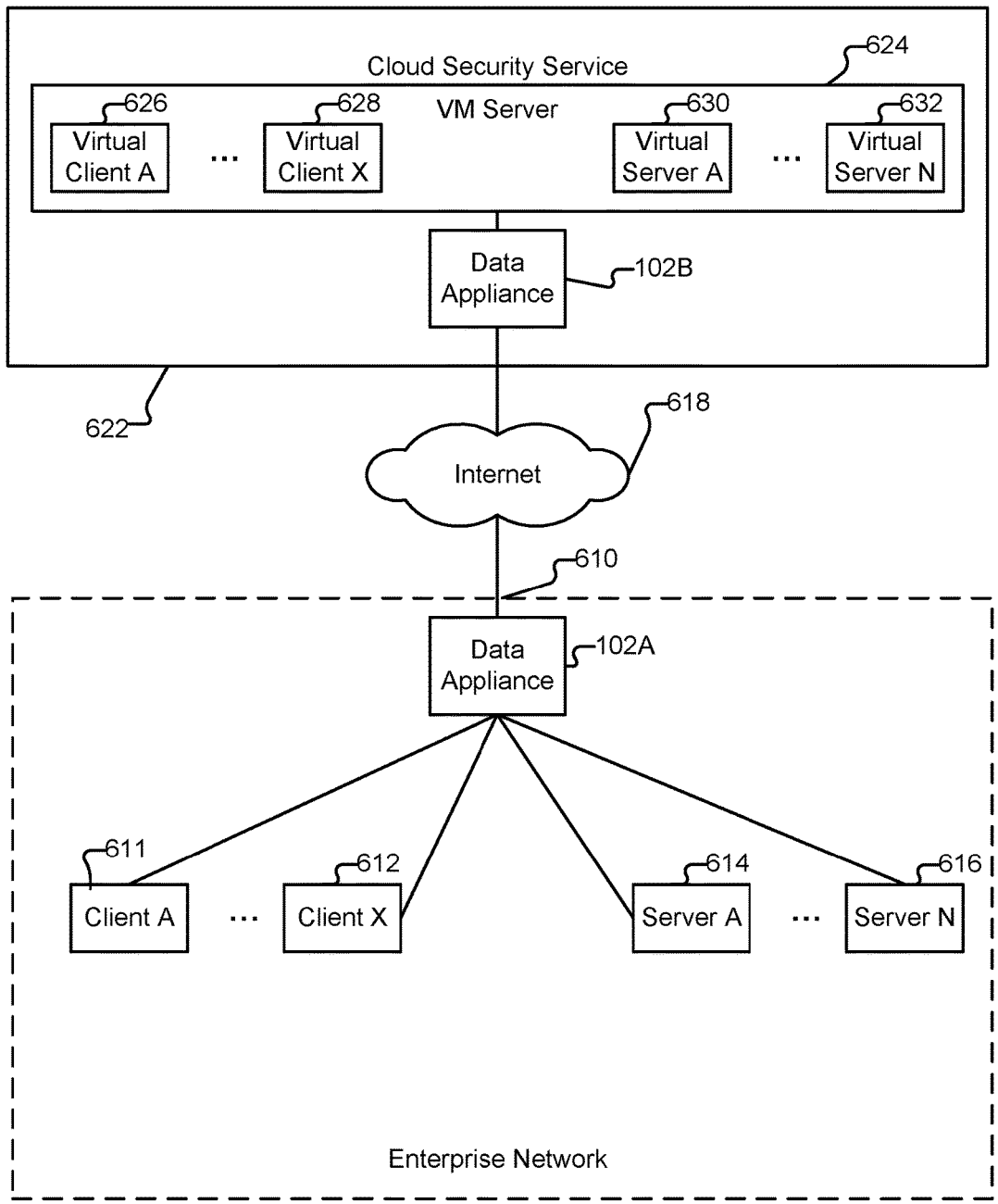
FIG. 6 is a block diagram illustrating an example honey network with a synchronized configuration to reflect a target network environment to implement virtual clones of selected devices of the target network in accordance with some embodiments.

Techniques for Synchronizing a Honey Network Configuration to Reflect a Target Network Environment to Implement a Clone of One or More Target Devices FIG. 4 is a block diagram illustrating techniques for synchronizing a honey network configuration to reflect a target network environment to implement a virtual clone of one or more target devices in accordance with some embodiments. For example, a high-fidelity cloned environment can be generated to emulate one or more devices in the target network environment using techniques described below. In an example implementation, synchronizing a honey network configuration to reflect a target network environment to implement a virtual clone of one or more target devices can be performed on an appliance or a computing device that is locally connected to or in local network communication with the target enterprise network (e.g., performed using a device that is also a member of the target enterprise network). In another example implementation, synchronizing a honey network configuration to reflect a target network environment to implement a virtual clone of one or more target devices can be performed using a cloud security service, such as shown in FIG. 6 and further described below with respect to FIG. 4.

As shown, a target enterprise network 410 includes a data appliance 102 and various other devices, which can include various clients or host devices, such as target device 404, and/or various other devices shown as 406-407 (e.g., network devices, printers, clients, servers, etc.). Target device 404 includes an agent 405 that executes on target device 404 to collect various device profile data, such as further described below. Agent 405 can communicate various device profile data to data appliance 102 (e.g., upon request, periodically, based on an event, or using various other push and/or pull communications that can be triggered based on various events, such as described below). Other devices (e.g., clients 406-407 and/or other devices in the enterprise network, such as server 408 and printer 409) can also execute an agent that can similarly collect various device profile data and similarly communicate such device profile data to data appliance 102. Data appliance 102 can store such device profile data locally (e.g., in a management plane, such as described below with respect to FIG. 5) or using an external data store. As described below, data appliance 102 can send device profile data (e.g., for one or more devices) to a cloud security service 422 (e.g., using a secure communication protocol, such as Internet Protocol Security (IPsec) or another secure protocol) over Internet 418 (e.g., such communications can be performed upon request, periodically, based on an event, or using various other push and/or pull communications that can be triggered based on various events, such as described below).

As also shown, cloud security service 422 includes a device profile data store 440 (e.g., device profile data can be stored in memory of a server or using an external data store). For example, the device profile data can be stored using an XML format or another structured data format. Cloud security service 422 also includes a VM image library 442. For example, the VM image library can include one or more (base) VM images that can be customized to instantiate VM clones of one or more devices of the target enterprise network, such as further described below. For example, a network administrator (admin) or security admin for the enterprise network can upload a set of VMs to include in the VM library (e.g., to provide VM images that cover commonly used or support client environments for clients in their enterprise network) and/or the cloud security service provider can similarly provide a set of VMs to include in the VM library. By maintaining a library of VM images, new VM instances can be more efficiently instantiated to clone target devices based on device profile data, such as further described below. Cloud security service 422 also includes a virtual clone manager 444. In an example implementation, a virtual clone of one or more target devices, such as target device 404, can be implemented by the virtual clone manager selecting an appropriate VM image from the VM library (e.g., a Microsoft Windows® 7 base image, with Microsoft Office® 2013, and Adobe Acrobat® 9 installed), and automatically customizing that base image based on the device profile data stored in device profile data 440 for target device 404 to provide a virtual clone of that target device. The customized VM image can be instantiated on a VM server 124 as a new VM instance, such as VM-1 126 or VM-n 128.

In some cases, the above-described lightweight honey network approach can be used for one or more of the devices in the target network for which there is not a locally executed agent that can provide more granular attribute information regarding the device (e.g., a printer, router, or other device). In some cases, the above-described lightweight honey network approach can be used for one or more of the devices in the target network for which a virtual clone is not yet configured and/or instantiated (e.g., based on resources, demand, and/or based on various other criteria that can be included in a honey network policy, such as described herein), and, in some use cases as mentioned above, the lightweight emulation of a particular device can be transitioned to using a virtual clone to emulate the target device in the honey network (e.g., or vice versa, a virtual clone can be denigrated to a lightweight emulation as discussed above). In one embodiment, virtual clone manager 444 can generate a new virtual clone or shut down a virtual clone of the honey network and/or generate a lightweight honey network emulation of one or more devices based on a honey network policy 446. For example, honey network policy 446 can be configured for each cloud security service customer to include one or more rules for implementing a honey network (e.g., when to instantiate new virtual clones and/or to spin down previously instantiated virtual clones based on resources, demand, and/or based on various other criteria that can be included in a honey network policy, such as described herein).

In one embodiment, the honey network is deployed in a public cloud, such as shown in FIG. 4. In another embodiment, the honey network is deployed in a private cloud, which can be similarly implemented using a VM server within the enterprise network, such as shown in FIG. 1.

In one embodiment, the honey network is deployed using VM instances executed on a VM server (e.g., in which virtual clones of target devices can be executed on the VM server, such as described herein with respect to FIG. 4). In one embodiment, the honey network is deployed to also include a high-interaction honeypot that is configured to capture extensive information on threats, in which the honeypot is implemented using real systems, applications, and services for attackers to interact with, such as various printers, servers (e.g., email servers, web servers, LDAP servers, file share servers, etc.), clients, and/or other devices.

The honey network techniques disclosed herein facilitate providing a virtual clone of one or more target devices that can be used to detonate malware using that virtual clone. For example, the virtual clone can be configured to synchronize the installed software (including versions thereof) and various configuration settings of the target device. As such, this can provide for a better sandbox environment for testing malware, because malware can be targeted to certain exploits, which are generally associated with certain software, including versions of the software and/or patch levels (e.g., Microsoft Windows® XP, Service Pack 2, Adobe Acrobat® Version 7, etc.). Also, an attacker may detect that the malware has been redirected to a sandbox environment if certain configuration related settings have changed (e.g., do not match previous settings detected on the actual target device), such as location with the network, IP address, proxy settings, logged in user, and/or various other settings. In addition, the honey network techniques disclosed herein also provide for routing traffic (e.g., certain traffic can be routed based on a honey network routing policy implemented by a firewall device on the enterprise network) from a suspicious/compromised device in the target network to one of the emulated devices, such as virtual clones or a lightweight emulation of the device, in a honey network to bridge the target network with the honey network in dynamic and intelligent ways. As disclosed herein, the device profile of the target device(s) of the enterprise network can be determined using network data and/or an endpoint presence (e.g., an agent executed locally on the device) to detect the environment of the target hosts in order to synchronize or "clone" relevant aspects of the device and network to provide for a honey network that more accurately and more realistically reflects the target device(s) and the target network environment.

In one embodiment, an agent is deployed to devices (e.g., endpoints) on the enterprise network. For example, commercially available agent software can be used to collect device profile data, such as the Global Protect agent from Palo Alto Networks, Inc. and/or other commercially available or open source/freeware agents can be used to collect device profile data. The agent can be configured to automatically collect data from the device, which is referred to herein as device profile data. For example, device profile data can include installed software and versions, and various configuration data (e.g., Operating System (OS) configuration settings, such as logged in user, browser proxy settings, network settings, and/or various other OS, device, and/or network related settings). The device profile data of a target device (e.g., in which malware was determined to be directed to the target device) can be used to synchronize with the honey network implementation such that the device profile data can be used, for example, to deploy a decoy host (e.g., a virtual clone, which in some cases can be used for detonating malware that was directed to the target host, in which the virtual clone can be implemented using a VM image customized based on the device profile data and instantiated in an instrumented VM environment as described herein). In an example implementation, device profile data (e.g., Host Information Profile (HIP) data) received from the agent (e.g., Global Protect (GP) agent or another agent) can be used to automatically select a host VM configuration from a VM library (e.g., selecting a VM image that most closely matches the installed OS/version, installed application software/version, and/or other HIP data of the target device) to provision a new VM instance to clone the target device based on the HIP data (e.g., further customization may also be performed to configure the VM instance to match relevant HIP data and/or other configuration or network related values/settings). As such, the decoy host can be configured to execute the same version of OS and same versions of application software as the target host. In addition, the decoy host can be configured with the correct configuration settings to match such configuration settings/state of the target device (e.g., how long the device has been live/up and running, IP address, proxy settings, default printer, LDAP server, default DNS server, and/or configuration settings/state of the target device).

In one embodiment, data appliance 102 is configured to collect network data to identify devices (e.g., using a network sensor to identify and detect high profile devices/hosts, default printer, LDAP server, default DNS server, etc.) reachable from the target device. For example, the high profile devices/hosts in communication with the target device (e.g., default printer, LDAP server, default DNS server, and/or other devices) can be similarly synchronized (e.g., replicating the service(s) and IP addresses, and/or other aspects of such other devices) to implement virtual clones of such other hosts in the honey network environment to more accurately and more realistically represents the target device(s) and the target network environment. For example, if a target device 404 is in communication with a server 408, such as an Active Directory (AD) server or a file share server, or a printer 409, then the server or printer can be implemented using a virtual clone that is configured with the same IP address as each corresponding actual device in the target enterprise network. As further described, certain traffic from a suspicious/compromised device in the target network can be routed to one of the emulated devices, such as virtual clones or a lightweight emulation of the device, in a honey network to bridge the target network with the honey network in dynamic and intelligent ways.

In another embodiment, a template network is used as a default to emulate in the honey network (e.g., if such network sensed data is not available or to more efficiently implement a virtual network environment in the honey network). For example, a template network can be initially instantiated in the honey network along with a virtual clone of a target device, and other devices can be implemented as virtual clones in the honey network based on demand and/or other criteria (e.g., if a request from the virtual clone is directed to a different device of the enterprise network, then that device can be cloned in the honey network, using device profile data and/or network sensed data).

In one embodiment, automatic mirroring and synchronization of the honey network configuration to reflect the target network environment is performed using the User-ID for user identification available from data appliance 102. As discussed above, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). For example, the User-ID feature can be applied to provide a mapping of domain user names to IP addresses (e.g., User-ID data). This User-ID data can be used to automatically configure IP addresses for each user's device(s) reflected (e.g., cloned) in the honey network to keep such actual IP addresses in the target network synchronized with the corresponding virtual clones of such devices in the honey network (e.g., such IP addresses can change over time, due to dynamically assigned IP addresses, a newly added device, and/or other IP address related configuration changes in the target network).

In one embodiment, agents are deployed on devices on enterprise network 410. The agents execute locally on each device to detect what software and versions are installed on the device, various configuration settings, and/or other aspects (e.g., time since last boot up, logged on user, and/or various other aspects). In an example implementation, when a device is connected to the enterprise network (e.g., a newly added device, or a device that connects wirelessly via DHCP, etc.), the data appliance can be configured to automatically push an agent to the device. The data collected by the agent is generally referred to herein as device profile data. The agent can also be configured to automatically communicate the device profile data to the data appliance. In an example implementation, the data appliance can locally store the device profile data (e.g., in a data management plane of the data appliance, such as described below with respect to FIG. 5). In another example implementation, the data appliance can store the device profile data in an external data store. These agents can be configured to perform such activities periodically, upon demand/request (e.g., a request communicated from the data appliance), and/or based on an event (e.g., a reboot, a new IP address assignment, a logon, and/or other events). The data appliance can provide the device profile data for one or more of the devices to cloud security service 422, which can store the device profile data in device profile data store 440 (e.g., the device profile data can be stored in a memory of a server for faster performance, and/or in an external data store implemented by the cloud security service). As described herein, the device profile data can be consumed to implement virtual clones of target devices in enterprise network 410 to implement a honey network that more precisely emulates such devices in the honey network with greater fidelity (e.g., as compared to, for example, the low fidelity approach described above with respect to FIG. 3).

In one embodiment, active probing techniques can also be applied to perform device and service discovery on the enterprise network environment, such as using various commercially available and/or freeware/open source discovery/scanning tools, such as Nmap or other tools discussed above. Such a tool can be executed (e.g., on the data appliance or another device in the enterprise network environment or the cloud security service) to generate a network scan survey. For example, the network scan survey data can be used in addition to the agent-based device profile data, in which the network scan survey data can be used to supplement the device profile data that may not be obtained for all devices in the enterprise network (e.g., some devices may not have an agent installed for providing the device profile data, such as for devices that an agent is not available for the type of device and/or OS platform, such as certain printers, network devices, and/or other devices). As such, the network scan survey data can be used to generate low interaction support for such devices represented in the honey network as similarly discussed above with respect to FIG. 3.

In one embodiment, the device profile data includes user name information and IP addresses associated with each device. For example, User-ID data maintained by the data appliance can be used to harvest domain users and IP mappings, which can be implemented in the honey network representative of such devices to produce a realistic device IP environment in the honey network to auto-configure IP addresses and to keep such IP and user information synchronized with the target network environment (e.g., in which such information can change over time).

Bridging a Honey Network to a Suspicious Device in a Target Network

As an example use case scenario, the honey network can be intelligently bridged to a suspicious device (e.g., a compromised client/host or another device) in a target network (e.g., an enterprise network). This use case scenario will be further described below.

In an example use case scenario, assume that the honey network has been configured to clone a subnet of a target enterprise network (e.g., 10.0.01.0/24). As discussed above, a network scan (e.g., Nmap scan) can be performed on the subnet of the target enterprise network to generate a network scan survey. As also discussed above, the network scan survey data can then be processed to implement a low-interaction emulation of that subnet of the target enterprise network as a honey network (e.g., the honey network can be implemented as a private or public cloud as discussed above). In this example, the honey network can be allocated a separate IP space (e.g., 10.0.02.0/24). As such, no legitimate users/services should be attempting to scan or otherwise access the honey network. In this example, this honey network implementation just supports low interactions, as virtual clones have not yet been instantiated to emulate any of the target devices in the enterprise network.

A virtual clone can be instantiated for one or more of the target devices in the enterprise network to support high interactions for such target devices in the honey network. For example, a virtual clone can be instantiated for a target device based on various policies or criteria, such as to facilitate an intelligent bridging of a honey network to a suspicious device in the target network. As discussed above, agents can also be deployed on each of the devices and/or a subset of the devices (e.g., any or a subset of devices for which a compatible agent is available). In this example, assuming that device profile data is available for the target device, a virtual clone can be instantiated as a new VM instance on the VM server to implement a high-interaction emulation of the target device in the honey network, as similarly described above. For instance, if the device profile data indicates that the target device is a device executing Microsoft Windows® XP with Service Pack 3 (SP3), Microsoft Internet Explorer® Version 7, and Adobe Acrobat® Version 8, then an appropriate VM image from a VM library can be selected and/or a base VM image can be customized to instantiate and execute a VM instance with the same executing software environment. In addition, various other configurations and/or settings can also be configured in the VM image to emulate the current target device operating environment (e.g., logged on user, IP address, time since last reboot, default printer, configured DNS server, configured email server, etc.). In an example implementation, a cloud security service can be configured to process the device profile data of any target devices to be virtually cloned and also process the network scan survey data to implement a virtual emulation of that subnet of the target enterprise network as a honey network executed as VM instances on a VM server in an instrumented VM environment provided by the cloud security service (e.g., the honey network can be implemented as a private or public cloud as discussed above). As such, one or more target devices are virtually cloned in the honey network to support high interaction in the honey network and other devices in the subnet of the target network environment are supported for low interactions in the honey network. As further discussed below, communications from a suspicious device in the target network to target devices in the target network can be routed to the honey network to bridge the honey network to the suspicious device in the target network.

In this example use case scenario, a host/target device can be cloned to execute a virtual clone (e.g., in which a clone host can be implemented as a VM instance configured to match device profile data for the target device). Assume that a Client A (e.g., a device in an enterprise network that is a "victim" or target of the malware) is executing the following software: Microsoft Windows® XP SP3, Oracle Java® 1.07, Adobe Reader® 9.3, Microsoft Office® 2013, and/or various other software. In this example, Client A is also executing an agent, such as a Palo Alto Networks Global Protect (GP) agent, a Cyvera agent, and/or another commercially available/open source/freeware agent that is configured to collect and report device profile data such as described herein (e.g., in some cases, a device can be configured to execute one or more of these agents and device profile data that is collected can be merged and/or selected based on various criteria and/or policies). In an example implementation, the agent can provide a snapshot of such installed software, configuration, and settings associated with Client A at a given time interval to detect one or more of the following attributes of the client, such as device/OS configuration and settings, installed OS and version, installed applications and versions, and/or any other relevant host and network artifacts (e.g., logged in user name, configured domain controller, DNS, assigned IP address, browser proxy settings, configured local time zone, installed OS/application language packs (such as English, Japanese, Chinese, and/or other language packs installed on the OS platform), time since last reboot, network session logs, and/or other attributes of the client/device). The agent snapshotting operation can be performed periodically, in response to a snapshot request/on demand, and/or in response to an event (e.g., a determination that malware destined for Client A is detected by a data appliance, and, as a result, Client A is selected to be cloned in a honey network executed in a VM environment). The agent executed on Client A can send these collected host attributes (e.g., device profile data, which includes various high-fidelity host information, including Host Information Profile (HIP) data in some cases) to a data appliance and/or to a cloud security service on demand, periodically, or based in response to an event (e.g., a communication directed from a compromised device on the target network, such as host 406 or 407, to Client A is detected by data appliance 102, such as shown in FIG. 4). In some cases, this data can be sent from the agent to the data appliance and/or via the data appliance to the cloud security service as a message (e.g., a heartbeat message).

Referring to FIG. 4, assume that network communications are performed between a remote device 420 (e.g., a web server, a remote host, or another remote device) and a (local) device (e.g., device 406) on enterprise network 410 (e.g., a web session, email, or other network communications). If malware 430 is detected as being sent to, for example, device 406, then data appliance 102 can detect such malware (e.g., using application-based firewall techniques for scanning malware during a web session, such as described above with respect to advanced or next generation firewalls). As another example, other activities (e.g., network communications from device 406 or other activities associated with device 406) can be used by data appliance 102 to determine that the local device has been infected with malware or otherwise compromised using various firewall and/or other host-based security techniques. As a result, device 406 is determined to be a suspicious or compromised device on enterprise network 410. At this point, based on a policy, data appliance 102 can select target device 404 (e.g., Client A) for emulating in a honey network (e.g., which can also be determined based on a honey network policy that can also be similarly implemented using data appliance 102, such as described above with respect to FIG. 4, such as based on a communication attempt from device 406 to target device 404). Data appliance 102 can then send device profile data for target device 404 (e.g., Client A) to cloud security service 422 for instantiating a VM instance that clones target device 404 (e.g., Client A). In an example implementation, data appliance 102 can be configured to send current device profile data for target device 404 (e.g., Client A), along with current session data associated with that web session for target device 404 (e.g., Client A), and such data can be sent (e.g., in a package) along with the malware (430) to the cloud security service 422. As similarly described above, cloud security service 422 can then instantiate a virtual clone to execute a cloned version of target device 404 (e.g., Client A) in the VM environment provided by the cloud security service. Based on a honey network routing policy, certain communications from compromised device 406 that are directed to target device 404 can then be routed to the virtual clone of target device 404 in the VM environment provided by the cloud security service.

As shown in FIG. 4, cloud security service 422 provides a VM environment implemented using VM server 124. Cloud security service 422 also includes a VM library that can include a plurality of VM images (e.g., a library of different VM images, such as Microsoft Windows® XP, Microsoft Windows® 7, Microsoft Windows® 8, etc.) to support a variety of different clients that are common or present in a customer's enterprise network, such as enterprise network 410. For example, if the target device (e.g., Client A) is executing Microsoft Windows® XP SP3, then a VM image for Microsoft Windows XP® can be loaded and booted in the VM environment, and other attributes can be implemented by patching the base image of this VM instance (e.g., dynamically such that it can be patched on-the-fly, such as in a number of seconds when performed in memory on the VM server, such as the server described above). For example, the base image of this VM instance can patch the Microsoft Windows® XP OS with the Service Pack 3 (SP3) patch and can also be configured with Oracle Java® 1.07, Adobe Reader® 9.3, and MS Office® 2013 to customize the preconfigured Microsoft Windows® XP OS environment to clone the target device (e.g., Client A) environment, including any other relevant device profile data that was included in the agent snapshot provided to the cloud security service for implementing a high-fidelity cloned environment for that target device—Client A (e.g., any other useful host and network artifacts, such as described above, including, for example, various other installed application software, device/OS configuration settings and other settings, and/or other attributes). In some cases, the customizing of the VM image can include patching the last reboot time based on the value for that attribute received in the most recent snapshot for the target device—Client A and any other relevant host and/or network artifacts, such as logged in user name, configured domain controller, DNS, IP, browser proxy settings, local time zone, installed OS/application language packs, and/or network session logs. In another example, a plurality of different VM environments can be preconfigured and mounted to clone a significant number of target host devices (e.g., to reflect various supported and/or common host device environments present in the enterprise network). A variety of approaches can be used to efficiently execute a VM instance that clones the target host in a VM environment using the techniques described herein.

At this point, the virtual clone of the target device (e.g., Client A) is executing in the VM environment. Specifically, communications from compromised device 406 that are directed to target device 404 can then be routed (e.g., using data appliance 102 based on a honey network routing policy) to the virtual clone of target device 404 in the VM environment provided by the cloud security service (e.g., customized VM instance, such as VM-1 126 executed on VM server 124) to provide for bridging of the compromised device to the honey network using virtual devices that emulate a relevant target network environment in the VM environment (e.g., one or more other devices of the target network environment can also be cloned using other VM instances, and/or one or more other devices can be supported for low-interaction support, such as the devices in the relevant subnet of the target device—Client A, such as using the techniques described above with respect to FIG. 3, which can be implemented using another VM instance, such as VM-n 128 executed on VM server 124).

In one embodiment, an agent executed on a compromised device (e.g., and/or other devices on the enterprise network) can also collect local configuration and/or network log data that can also be used to provide information identifying a relevant surrounding network environment of the compromised device. For example, such information can include recent network connections from the compromised device to other devices on the target enterprise network and protocols that were used for such network communications (e.g., based on collected active sessions data for the compromised device, it can be determined that the compromised device communicated via local network file share/server, local network printer, AD server, DNS server, etc.). For example, VM instances can be launched on demand in the VM environment for each of these other relevant devices to clone such devices in the network environment of the compromised device in the VM environment (e.g., another client/host device, IP address and domain of AD server, DNS, file share, printer, etc.) to facilitate a more accurate and realistic honey network that would be even more difficult for an attacker or unauthorized user to detect as being a sandbox/VM environment as opposed to the actual target network environment (e.g., that the communications from the compromised device are being routed to the sandbox/VM environment as opposed to the actual target network environment). As similarly described above, the VM library can be used to efficiently instantiate clones of such other devices in the target network based on the device profile data (e.g., IP address and domain data associated with AD, DNS, file share, and printer can be included in such collected data).

As an example, if a new session from cloned Client A, such as a virtual clone of target device—Client A 404, in the VM environment indicates a new print session (e.g., TCP SYN directed to IP address of a printer, such as corresponding to printer 409), then a cloned printer VM instance can be instantiated dynamically in the VM environment (e.g., using virtual clone manager 444 and VM image library 442, such as similarly described above) to handle (e.g., with high fidelity) such a network session, such that a VM instance of such emulated device (e.g., printer) can respond appropriately to the TCP SYN packet and/or other interactions between the virtual clone of Client A and the virtual clone of the printer in the honey network executed in the VM environment. In an example implementation, the VM library can include a variety of different VM images for such target devices that can be efficiently loaded on demand in the VM environment by the VM clone manager to implement high-fidelity VM instances that can appropriately respond to such protocols and session traffic for that type of device in the honey network to emulate a relevant subset of devices in the target network environment to facilitate a honey network that more accurately and more realistically reflects the target network. An advanced attacker (e.g., an unauthorized user attempting an APT attack) may similarly attempt to detect whether or not their malware is being executing in a VM environment by, for example, attempting to determine whether the expected surrounding network environment is present, such as by checking to see if the expected local file share, local network printer, local AD, local DNS, and/or other clients/hosts are present and respond to interactions as expected. Thus, by implementing virtual clones of one or more of the devices (e.g., as described with respect to FIG. 4) and/or at least providing lightweight emulations of one or more of the devices (e.g., as described with respect to FIG. 3) in the surrounding network environment of the compromised device in the honey network executed in the VM environment, a more robust honey network for the relevant target network environment is provided for the compromised device to facilitate intelligent bridging of the compromised device to the honey network and to allow for more effective intelligence gathering and monitoring of advanced threats and activities by attackers perpetrating such advanced threat attacks directed towards the target network environment.

While the above-described embodiment discusses a use case scenario for the cloud security service for an example enterprise network environment of a customer of the cloud security service, it should be apparent to those of ordinary skill in the art that the cloud security service can similarly support multiple different target enterprise networks for different customers. In an example implementation, the honey network configurations and executions can be performed on one or more VM servers. In some cases, if two different customers are supported using a single VM server, then the data and VM environments of the two different customers can be securely partitioned to secure and partition any data between such customers. In other cases, each customer can be allocated a separate VM server for implementation of the VM environments for each customer. As also discussed above, in some cases, the VM environment for a given customer can be provided using a VM environment executed on a VM server that is locally deployed on the customer's enterprise network to avoid any data leaving the customer's enterprise network to implement the honey network techniques disclosed herein. Various other combinations or approaches to deploying and partitioning the VM environment for implementing these disclosed honey network techniques can be provided as would now be apparent to one of ordinary skill in the art in view of the various embodiments disclosed herein.

Example Data Appliance Logical Architecture

Figure 5:
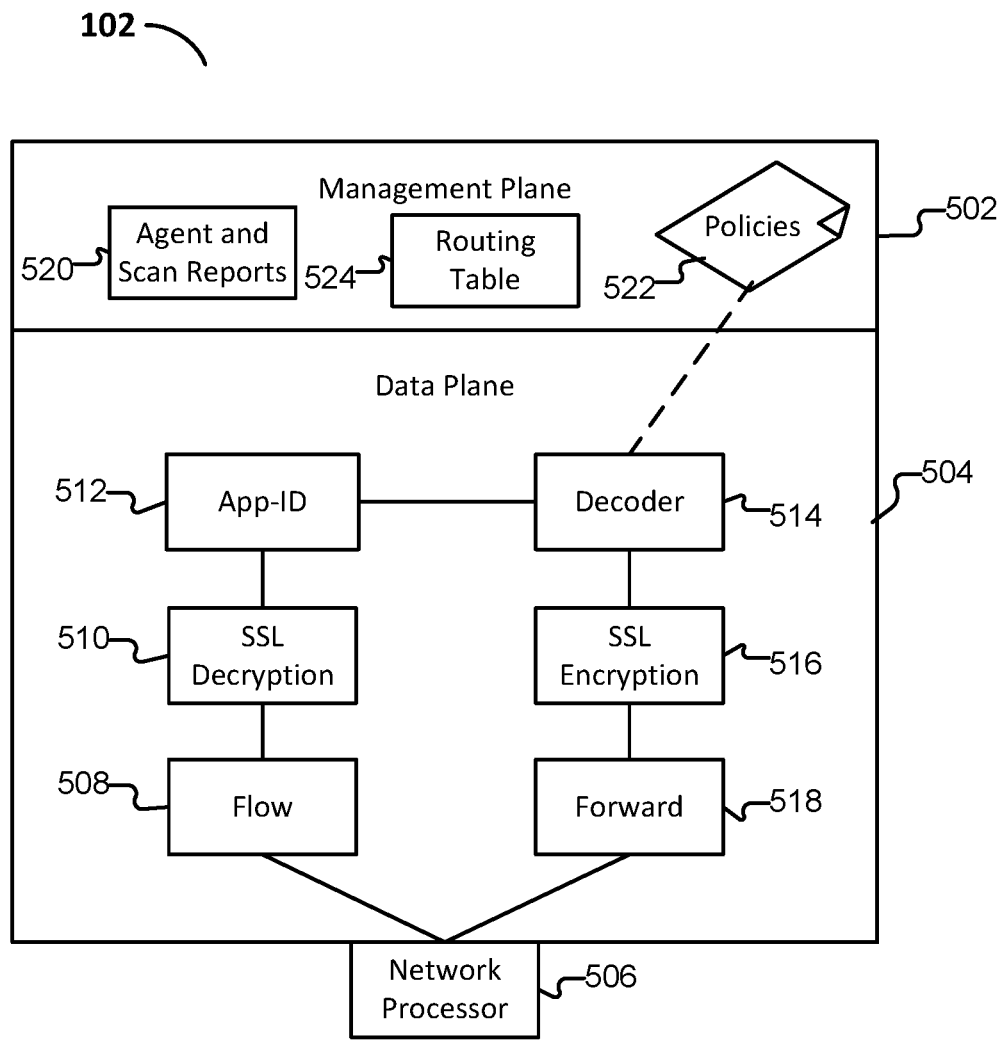
FIG. 5 is a block diagram illustrating an example logical architecture of a data appliance for providing a honey network in accordance with some embodiments.

FIG. 5 is a block diagram illustrating an example logical architecture of a data appliance for providing a honey network in accordance with some embodiments. As discussed above with respect to FIG. 4, devices can be located and operating within an enterprise secured network environment 410. Devices accessing other devices within the enterprise network and/or accessing the Internet 418 and various web sites or web services (e.g., Microsoft Office Online®, SalesForce.com®, Apps.gov, Google® search and/or services, Facebook®, Skype®, and various other online resources) available via the Internet do so through the security infrastructure of the enterprise security network, such as through the enterprise firewall/security appliance shown as a data appliance 102.

Referring to FIG. 5, the example shown is a representation of logical components that can be included in data appliance 102. As shown, data appliance 102 includes a management plane 502 and a data plane 504. In one embodiment, the management plane is generally responsible for managing user interactions, such as by providing a user interface for configuring policies and viewing log data. The data plane is generally responsible for managing data, such as by performing packet processing and session handling.

Suppose a device 406 attempts to access a server 420 using an encrypted session protocol, such as SSL. Network processor 506 is configured to receive packets from device 406, and provide the packets to data plane 504 for processing. Flow 508 identifies the packets as being part of a new session and creates a new session flow. Subsequent packets will be identified as belonging to the session based on a flow lookup. If applicable, SSL decryption is applied by SSL decrypter 510, and similarly traffic can be encrypted using SSL encrypter 516. Otherwise, processing by SSL decrypter 510 is omitted. Application identification (App-ID) component 512 is configured to determine what type of traffic the session involves and to identify a user associated with the traffic flow. For example, App-ID 512 can recognize a GET request in the received data and conclude that the session requires an HTTP decoder (e.g., to decode a web session in this example). For each type of protocol that can be decoded by data appliance 102, there exists a corresponding decoder 514. In one embodiment, the application identification is performed by an application identification component (e.g., App-ID engine) shown as App-ID 512, and a user identification is performed by another function/engine (e.g., a User-ID engine can be provided as another component of data appliance 102). Based on the determination made by App-ID 512, the packets are sent to an appropriate decoder 514. Decoder 514 is configured to assemble packets (e.g., which may be received out of order) into the correct order, perform tokenization, and extract out information. Decoder 514 also performs signature matching to determine what should happen to the packet. Processed packets can then be forwarded to a destination (e.g., depending on the applied policy (522)) using forward component 518.

As also shown in FIG. 5, agent and scan reports for devices on the enterprise network are received and stored in the management plane 502 in agent and scan reports 520. For example, the agent and scan reports can include the device profile data collected and reported to the data appliance as similarly discussed above with respect to FIG. 4. As another example, the agent and scan reports can also include network scan survey data resulting from executing a network scanning tool on the target network (e.g., a subnet of the target network) as similarly discussed above with respect to FIG. 3. In one embodiment, policy enforcement using device profile data based on policies 522 is applied as described herein with respect to various embodiments based on the monitored, identified, and decoded session traffic flows.

For example, based on a policy configured in policies 522 (e.g., which can include a honey network policy as discussed above, including, for example, a honey network routing policy 522 as disclosed herein, which can include rules for routing internal communications from a suspicious device to the honey network), malware destined to a target device during a web session can be sent to the cloud security service along with device profile data for the target device and network scan survey data for the target enterprise network to implement an intelligent detonation of the malware in the honey network environment, such as described above with respect to FIG. 4. As another example, based on a policy configured in policies 522 (e.g., applying a honey network policy configured for the enterprise network), communications from a suspicious device directed to a target device can be routed to the cloud security service along with device profile data for the target device and network scan survey data for the target enterprise network to implement an intelligent bridging of a honey network to the suspicious device of the target network, such as further described below with respect to FIG. 7.

In one embodiment, management plane 502 also includes a target device to honey network routing table 524. In an example implementation, the routing table is maintained as a distinct data structure for routing communications between an enterprise network and a honey network configured for the enterprise network. An example routing table is described in more detail below with respect to FIG. 6.

Example Honey Network with a Synchronized Configuration to Reflect a Target Network Environment to Implement Virtual Clones of Clients and Servers of the Target Network FIG. 6 is a block diagram illustrating an example honey network with a synchronized configuration to reflect a target network environment to implement virtual clones of selected devices of the target network in accordance with some embodiments. For example, a high-fidelity cloned environment can be generated to emulate one or more devices in the target network environment using techniques described herein. In an example implementation, synchronizing a honey network configuration to reflect a target network environment to implement virtual clones of selected target devices can be performed on an appliance or a computing device that is locally connected to or in local network communication with the target enterprise network (e.g., performed using a device that is also a member of the target enterprise network). In another example implementation, synchronizing a honey network configuration to reflect a target network environment to implement virtual clones of selected target devices can be performed using a cloud security service, such as shown in FIG. 6 and further described below.

As shown, a target enterprise network 610 includes a data appliance 102A and various other devices, which can include a plurality of different clients or host devices, such as various clients, shown as Client A 611 through Client X 612. The target network can also include a plurality of different servers and/or other devices, shown as Server A 614 through Server N 616 (e.g., network devices, printers, servers, etc.). Each of these devices can be configured with a deployed agent that executes on each device to collect various device profile data and communicate various device profile data to data appliance 102A and/or 102B, such as similarly described above. Data appliance 102A and/or 102B can store such device profile data locally or using an external data store, such as similarly described above. For example, data appliance 102A can send device profile data (e.g., for one or more devices) to data appliance 102B of a cloud security service 622 (e.g., using a secure communication protocol, such as Internet Protocol Security (IPsec) or another secure protocol) over Internet 618 (e.g., such communications can be performed upon request, periodically, based on an event, or using various other push and/or pull communications that can be triggered based on various events, such as described below).

As also shown in FIG. 6, cloud security service 622 can include a VM server 624 that can execute virtual clones of one or more of the selected devices of target enterprise network 610. In this example, a virtual clone of Client A 611 is instantiated and executed as Virtual Client A 626, a virtual clone of Client X 612 is instantiated and executed as Virtual Client X 628, a virtual clone of Server A 614 is instantiated and executed as Virtual Server A 630, and a virtual clone of Server N 616 is instantiated and executed as Virtual Server N 632, which can be implemented using the various techniques described herein to clone a device based on the device profile data collected and received from each agent executed on each device. For example, assuming Client A is assigned IP address 10.0.1.101 (ACME/Alice) and configured with Microsoft Windows® 7 Patch X, Microsoft Office® 2010, Oracle Java® 1.6, and Adobe Acrobat Reader 9.3.3 (e.g., and/or various other applications and/or configuration settings, such as described above), then Virtual Client A can be configured as a VM instance executing on the VM server that is assigned IP address 10.0.2.101 (ACME/Alice) and configured with Microsoft Windows® 7 Patch X, Microsoft Office® 2010, Oracle Java® 1.6, and Adobe Acrobat Reader 9.3.3 (e.g., and/or various other applications and/or configuration settings, such as described above) in order to clone Client A in the honey network. Assuming Client X is assigned IP address 10.0.1.102 (ACME/Bob) and configured with Microsoft Windows® 7 Patch Z, Microsoft Office® 2007, Oracle Java® 1.7, and Adobe Acrobat Reader 11 (e.g., and/or various other applications and/or configuration settings, such as described above), then Virtual Client X can be configured as a VM instance executing on the VM server that is assigned IP address 10.0.2.102 (ACME/Bob) and configured with Microsoft Windows® 7 Patch Z, Microsoft Office® 2007, Oracle Java® 1.7, and Adobe Acrobat Reader 11 (e.g., and/or various other applications and/or configuration settings, such as described above) in order to clone Client X in the honey network. As another example, assuming Server A is a web server (e.g., or another type of server, such as an LDAP/active directory server, DNS server, file server, and/or other types of servers, and/or other types of devices such as network devices, printers, etc.), then Virtual Server A can be configured as a VM instance executing on the VM server that is assigned an identical IP address and configured with matching OS and application software and versions (e.g., and/or various other applications and/or configuration settings, such as described above) in order to clone Server A in the honey network. Assuming Server N is a mail server, then Virtual Server A can be configured as a VM instance executing on the VM server that is assigned an identical IP address and configured with matching OS and application software and versions (e.g., and/or various other applications and/or configuration settings, such as described above) in order to clone Server N in the honey network.

In one embodiment, data appliance 102A also includes a target device to honey network routing table (e.g., routing table 524 of FIG. 5, which can be used for IP-based routing rules for integration of a target network environment with a honey network). In an example implementation, the routing table is maintained as a distinct data structure for transparently routing communications between an enterprise network and a honey network configured for the enterprise network. Referring to FIG. 6, an example routing table can include a mapping of devices on enterprise network 610 to virtual devices executed on VM server 624, such as shown below in which the actual and virtual devices can be identified with their assigned IP addresses. For example, as virtual devices are added or removed (e.g., a new VM instance can be instantiated to provide a virtual clone for a given target device and/or a VM instance can be terminated, which can be due to resource availability, honey network configuration policies or requirements, due to a technical software or hardware failure, and/or for other reasons, such as to launch a newly configured VM instance to provide a virtual clone that corresponds to the current configuration/settings of the target device), then the routing table can be updated (e.g., adding or removing an entry for that device to virtual device mapping or changing an availability field value, etc.). In this example routing table, routing rules can also be included to indicate whether or not a communication from a compromised device to a given target device should be redirected to the corresponding virtual device in the honey network if that virtual device is available (e.g., was instantiated and is currently executing a virtual clone instance on VM server 624 for a given target device). In another example implementation, routing rules are included in the honey network policy (e.g., policies 522 as shown in FIG. 5), and a determination of whether a communication that is sent from a compromised device and destined to a given target device should be routed (e.g., redirected) to the corresponding virtual device in the honey network if that virtual device is available is determined based on one or more rules included in the honey network policy. As will now be apparent to one of ordinary skill in the art, various other routing tables and honey network policies can be implemented to facilitate intelligently bridging a honey network to the suspicious device of the target network.

| Target Device | Virtual Device | Available | Routing Rule(s) |
|---|---|---|---|
| Client A - IP | Virtual Client A - IP | Yes | Redirect |
| Client X - IP | Virtual Client X - IP | Yes | Do not redirect |
| Server A - IP | Virtual Server A - IP | Yes | Do not redirect |
| Server N - IP | Virtual Server N - IP | Yes | Redirect |

Intelligently bridging a honey network to the suspicious device of the target network can be performed using the honey network illustrated in this example by using the various techniques described herein. An example use case scenario of performing intelligent bridging of a honey network to the suspicious device of the target network is described above with respect to FIG. 4.

In one embodiment, data appliance 102A and data appliance 102B are also configured with a honey network policy (e.g., policies 522 of FIG. 5). In an example implementation, the honey network policy includes routing rules that can be used to require that communications sent from a virtual device in the honey network (e.g., VM instance executed on VM server 624) to an external device (e.g., a device that is external to the enterprise network, such as a remote device available via the Internet, such as remote device 420 or another remote device) be routed from data appliance 102AB back through data appliance 102A (e.g., effectively using such as a proxy) and then routed to the Internet such that any such external communications (e.g., an attacker's "phone home" communications) are associated with the target enterprise network's Internet gateway (e.g., an Internet gateway external Internet-facing IP address as opposed to an external Internet-facing IP address of an Internet gateway associated with the cloud security service, as would be expected by the attacker if their malware were executing on a production host/device behind the Internet gateway on the target enterprise network). As such, the IP address associated with such virtual device to external device communications are uninhibited (e.g., allowed to be routed to such external devices) but are transparently associated with the IP address of the Internet gateway of the target enterprise network to facilitate an integration of a honey network with a real target network to counter IP and peer-checking evasion techniques as further described herein. In one embodiment, these techniques for integrating a honey network with a target network to counter IP and peer-checking evasions allow the IP address emanating from a virtual device in the honey network (e.g., a virtual clone executed on a VM server of the cloud security service) to appear to the external device to be associated with the target network environment (e.g., an Internet gateway external Internet-facing IP address of the target network) as opposed to an IP address associated with cloud security service facilitating the honey network (e.g., APT attacker's device would not see IP associated with the cloud security service provider's network, but rather would see the IP address associated with an Internet gateway external Internet-facing IP address of the target network). In one embodiment, such external network communications from virtual devices are routed from the honey network back to the target network environment as similarly described above, and in particular, are then routed through a proxy server (e.g., proxy server 450 as shown in FIG. 4) in the target network environment to proxy any such communications between the external device(s) and the virtual device(s) in the honey network using the proxy server.

The techniques described herein facilitate gathering of threat intelligence using the honey network in the instrumented VM environment. For example, call-back communication (e.g., C&C traffic communications) from malware executed in the instrumented VM environment can be observed in the instrumented VM environment. If matching C&C traffic communications are later observed in the actual enterprise network (e.g., observed using various network traffic monitoring techniques performed by data appliance 102 for enterprise network 410), then such C&C traffic communication activity can be associated with that malware sample (e.g., the malware email in this example use case scenario) detonated on the target host cloned in the VM environment. As a result, this facilitates correlation of various malware samples with the C&C traffic activity and also facilitates additional security analysis. For example, the C&C traffic indicates network traffic activity that can be analyzed including IP addresses and URLs extracted/associated with such C&C traffic, other hosts in communication with similar C&C traffic in the actual enterprise network, etc. Also, the malware analysis using the honey network and/or such additional analysis can be used to generate a signature for that malware as malware associated with such malware activities (e.g., C&C traffic and/or other malware or undesirable activities). As another example, these techniques can be used to determine which client devices or other endpoints are the patient zero of the C&C traffic, which provides for additional threat intelligence (e.g., from data/information that can be extracted from network communications that were correlated with that C&C activity(ies)). In addition, these techniques can be used to determine which client devices or other endpoints have been exposed to the malware (e.g., received network communications for a compromised device(s)) such that these devices can be remediated using various malware remediation techniques.

In one embodiment, reports are generated automatically that indicate to the user a summary of network activity seen from the compromised device as well as any activities performed on the virtual devices in the honey network. In an example implementation, a severity of events can be assessed based on previous network traffic profiling of the compromised device in question. For example, any session to a virtual device that was never previously contacted by the compromised device in the target network can be higher severity. In another example, contact or attempted contact from a virtual host to many other virtual and/or production hosts constitutes likely aggressive lateral movement attempts by the attacker, and can similarly be assigned a high severity. Other means for determining severity can involve any assignment of rank or severities to the various activities observed within the instrumented VMs during analysis of an attack.

Threat Forensics, Intelligence Reporting, and Protections

In one embodiment, during/after the completion of analysis of a malicious event or malware sample by the virtual honey network (honeynet) environment, all instrumented data collected from the VM hosts and VM manager are processed to deliver any/all of the following: (1) an alert to the operator indicating that malicious activity has occurred that requires the attention of the security response team; (2) a technical forensics report of the incident describing in detail all events observed on the VM hosts and the virtual honey network, including, for example, all host-based and network-based artifacts that might be present in a stand-alone sandbox forensics reports (e.g., WildFire® from Palo Alto Networks or other security service related products), such as modified files, Windows registry changes, network requests, behavioral summary, etc., for each host that was "touched" during the analysis timeframe by the attacker, presented as a timeline of events; and (3) host-based and network-based protections (e.g., host-based or network-based signatures) or indicators of compromise that can be used by the operator to detect the same or similar attack/attacker on the real production network.

Example Components of a Virtual Clone Manager

Figure 7:
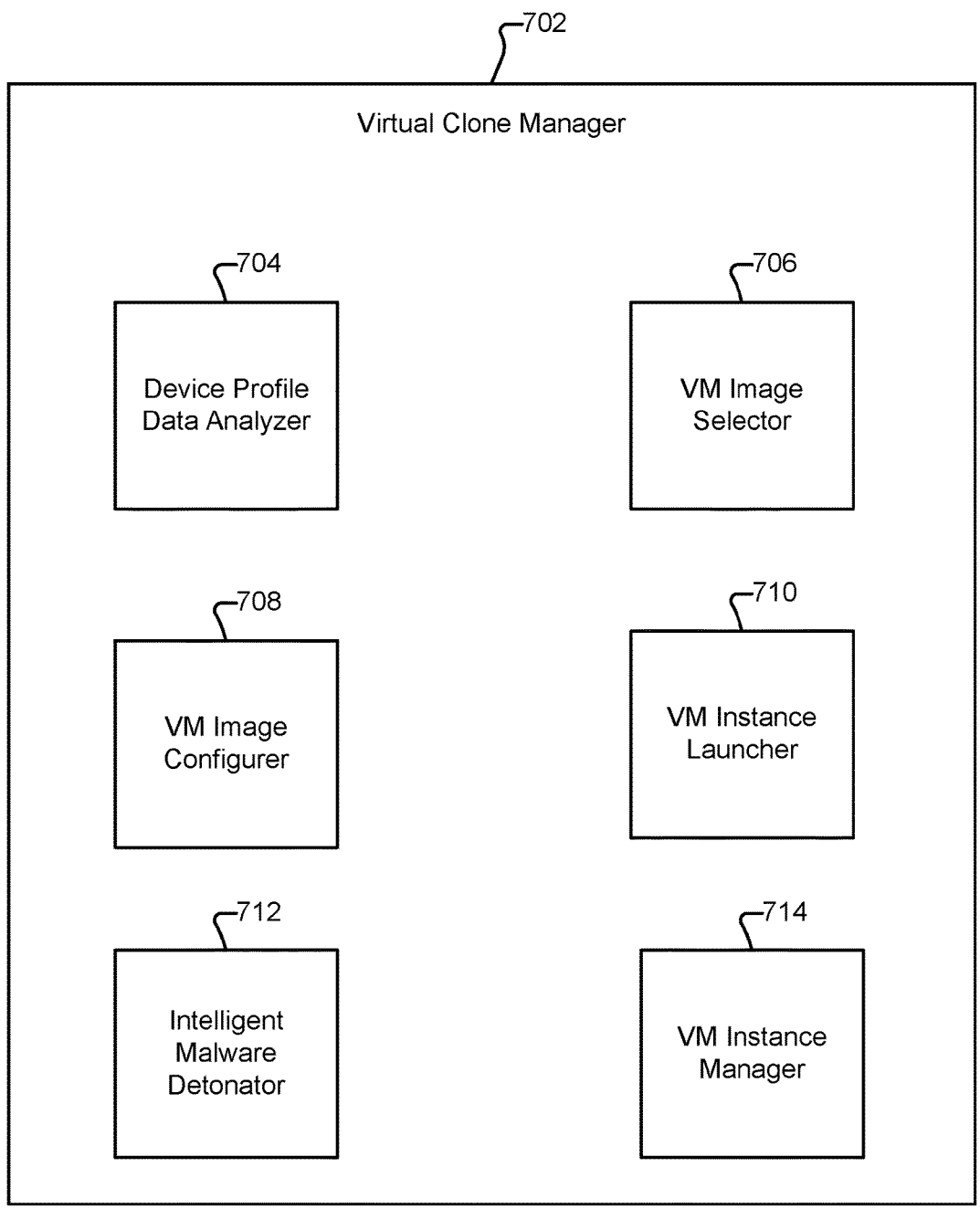
FIG. 7 is a block diagram illustrating example components of a virtual clone manager for implementing a honey network in accordance with some embodiments.

FIG. 7 is a block diagram illustrating example components of a virtual clone manager for implementing a honey network in accordance with some embodiments. For example, the virtual clone manager can be used to facilitate the various above-described use case scenarios for facilitating intelligent bridging of a honey network to a suspicious device in an enterprise network, such as described above. In an example implementation, the virtual clone manager is implemented as a component of the cloud security service that facilitates intelligent bridging of a honey network to a suspicious device in an enterprise network, such as described above.

Referring to FIG. 7, a virtual clone manager 702 includes a device profile data analyzer 704. For example, the device profile data analyzer can retrieve device profile data (e.g., from a device profile data store (shown as 440 in FIG. 4)) for a selected target device and extract any or all of the device profile data, which can be used for selecting a VM image.

VM image selector 706 receives the device profile data for the selected target device from device profile data analyzer 704 and uses that processed device profile data to select an appropriate VM image (e.g., from VM image library data store (shown as 442 in FIG. 4)). For example, if a VM image that has the same OS and version (e.g., a Microsoft Windows® 7 image) is present in the VM library, then that VM image can be selected. In some cases, VM images are present in the VM library that match a variety of different combinations of OS and version combinations (e.g., and in some cases, patch levels) and, in some implementations, preexisting VM images may be present in the VM library that also have various combinations of application software and versions (e.g., and in some cases, patch levels) installed (e.g., in some scenarios, a set of VM images are created and stored in the VM library to account for common base image configurations that are used for one or more enterprise networks that are supported for these honey network configuration techniques).

VM image configurer 708 automatically configures the selected VM image as selected by the VM image selector 706 to be configured with various other software version/patch configurations and/or other configuration settings to be synchronized with the device profile data for the target device using the device profile data provided by device profile data analyzer 704. Examples of other software version/patch configurations and/or other configuration settings and device state to be synchronized with the device profile data for the target device can include installed OS including version and patches, installed applications including version and patches, and/or any other relevant host and network artifacts (e.g., logged in user name, configured domain controller, DNS, assigned IP address, browser proxy settings, configured local time zone, installed OS/application language packs (e.g., English, Japanese, Chinese, and/or other language packs installed on the OS platform), time since last reboot, network session logs, and/or other attributes of the client/device).

VM instance launcher 710 launches (e.g., instantiates and executes on a VM server (124)) the configured and selected VM image in an instrumented VM environment to generate a virtual clone of the target device in a honey network that has attributes that are synchronized with the attributes of the target device on the enterprise network, in which one or more other devices of the target network can also be reflected using virtual clones that similarly have attributes that are synchronized with the attributes of their corresponding actual devices in the target enterprise network. For example, the configured and selected VM image can be instantiated and executed as a VM instance on a VM server (e.g., a VM instance 126 or 128 on a VM server 124).

In one embodiment, virtual clone manager 702 also includes an intelligent malware detonator 712. For example, intelligent malware detonator 712 can detonate a malware sample in a virtual clone of the target device using the honey network. The virtual clone can be executed in the instrumented VM environment to facilitate intelligent detonation of malware using the virtual clone, such as described above with respect to various use case scenarios.

VM instance manager 714 performs various additional virtual clone management functions. For example, the VM instance manager can select one or more virtual clones for modifications of one or more attributes to maintain synchronization with the attributes of their respective corresponding devices in the actual target enterprise network. As another example, the VM instance manager can select one or more virtual clones for removing from the VM environment (e.g., if the malware emulation has been completed, based on a honey network policy for such honey network activities for intelligent malware detonation, such as a time criteria, computing resource criteria, and/or other criteria, and/or if the corresponding actual device has been removed from the target enterprise network).

Whenever the virtual clone manager is described as performing a task, a single component, a subset of components, or all components of the virtual clone manager may cooperate to perform the task. Similarly, whenever a component of the virtual clone manager is described as performing a task, a subcomponent may perform the task and/or the component may perform the task in conjunction with other components. In various embodiments, portions or all of the virtual clone manager components are implemented in software executed on a processor (e.g., of a computing device or appliance, such as software implemented in Java, C++, Python, or another programming language). In various embodiments, portions or all of the virtual clone manager components are implemented in hardware (e.g., an ASIC, FPGA, and/or other programmable hardware components). Depending on factors such as the amount of computing resources available to the virtual clone manager, various logical components and/or features of the virtual clone manager may be omitted and the techniques described herein adapted accordingly. Similarly, additional logical components/features can be added to the virtual clone manager as applicable.

Example Process for Bridging a Honey Network to a Suspicious Device in an Enterprise Network In one embodiment, a device (e.g., a host or another device) in an enterprise network is suspected of being compromised by an advanced persistent threat (APT). The device can be determined to be compromised based on various security techniques (e.g., signatures, behavioral, and/or other security techniques), such as using IPS signatures, C&C signatures, antivirus signatures, DNS traffic, URL signatures, botnet reports (e.g., recently registered domains, use of dynamic DNS, use of repeated EXE downloads from X domain, etc.), and/or various other techniques. For example, the determination that the device is suspicious (e.g., compromised by an APT) can be performed using a firewall device (e.g., data appliance 102) or using other techniques (e.g., host-based security or other security techniques). As similarly described above, based on a policy (e.g., a honey network policy for routing communications to/from a suspicious/compromised device on the enterprise network, which can be executed using a firewall device), communications from the compromised device can be routed to a honey network (e.g., implemented using a VM environment that includes one or more virtual devices, such as high-interaction virtual clones and/or low interaction virtual devices as described above) to facilitate an intelligent bridging of the honey network to the compromised device of the enterprise network.

As such, unlike the above-described techniques for intelligently detonating a malware sample in a virtual clone of the honey network, these techniques for intelligently bridging the honey network to the compromised device effectively blackhole the compromised device by routing (e.g., redirecting) internal network communications from the compromised device to virtual devices of the honey network. In an example implementation, the honey network can be implemented using a VM environment that includes one or more virtual devices, such as high-interaction virtual clones and/or low interaction virtual devices as described above, for emulating such actual devices on the enterprise network. As a result, the honey network provides a realistic emulation of a surrounding target network environment of the compromised device in the enterprise network.

For example, once a host in the enterprise network is determined to be compromised (e.g., based on a signature, heuristic, or other techniques for malware detection), any outbound traffic from the compromised host that is directed to another device in the enterprise network (e.g., internal network communications) can be routed to honey network (e.g., the honey network can be implemented using a private or public cloud implementation as discussed above). Outbound traffic from the compromised host can be allowed to communicate to external devices (e.g., to not disrupt command and control (C&C) traffic communications, and/or other external network communications that can then be monitored and logged for competitive intelligence gathering using various techniques described herein). The outbound and inbound routing can be configured based on a policy (e.g., a honey network routing policy for compromised devices on the enterprise network, in which certain inbound traffic can be routed to the honey network based on the policy, and certain outbound traffic may be routed to the Internet based on the policy, and/or other actions can be performed, such as to block certain traffic, log certain or all traffic from/to the compromised device, generate an alert, and/or other actions/rules can be configured in the policy).

Accordingly, these techniques for intelligently bridging the honey network to the compromised device effectively blackhole compromised devices, such that an APT attacker's efforts to move from a given compromised device to other devices on the enterprise network are thwarted as any such internal network communications from the compromised device are redirected to the honey network configured to emulate one or more devices of the target network. This prevents an APT attacker from exfiltrating data and/or performing further damage to other devices on the target network. This approach also allows for monitoring of APT attacker's activities to facilitate various threat intelligence and detection for APT attacks.

An example process for intelligently bridging the honey network to a suspicious device in an enterprise network will now be described.

Figure 8:
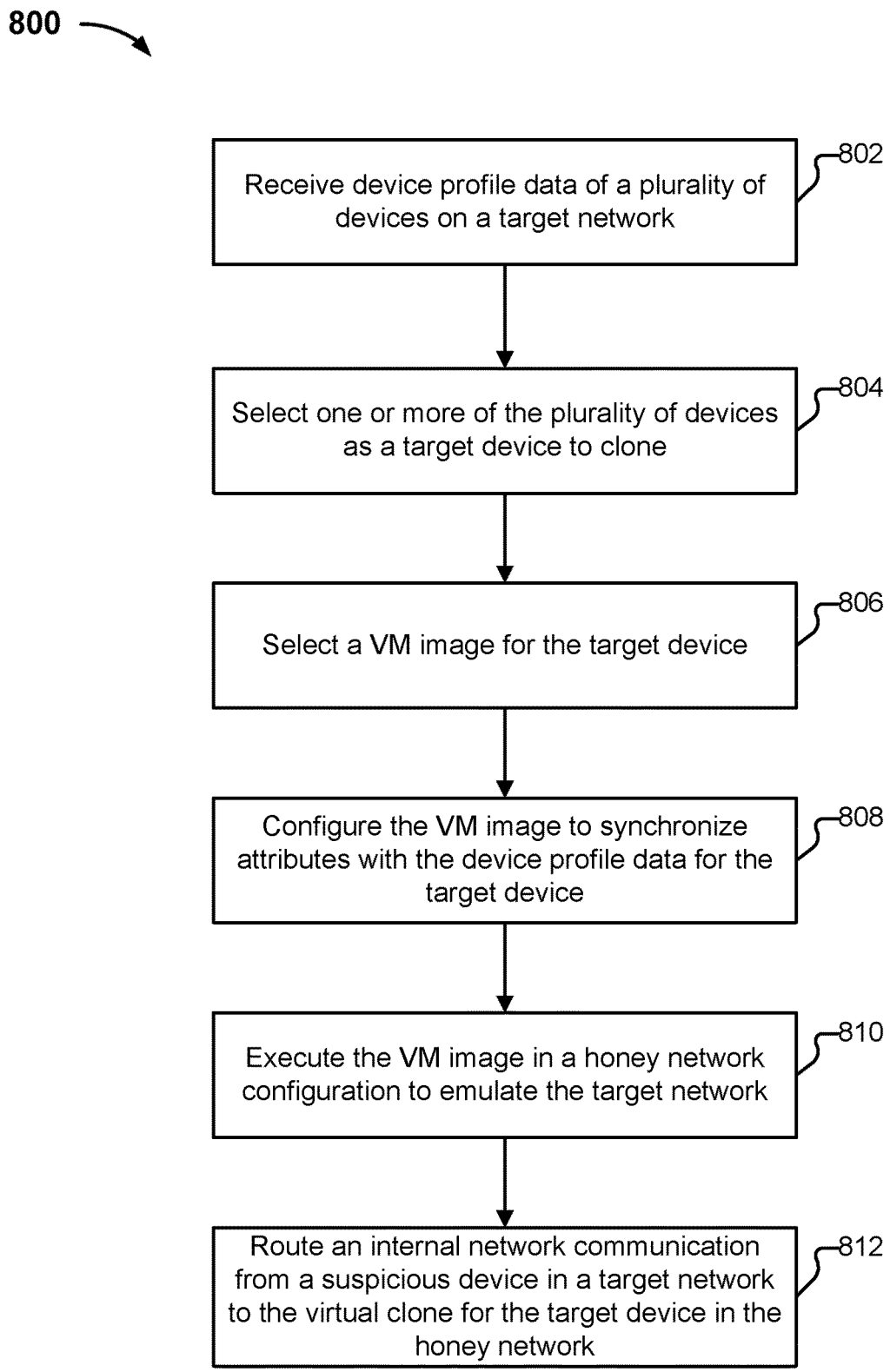
FIG. 8 is a flow diagram illustrating a process for intelligently bridging the honey network to a suspicious device in an enterprise network in accordance with some embodiments.

FIG. 8 is a flow diagram illustrating a process for intelligently bridging the honey network to a suspicious device in an enterprise network in accordance with some embodiments. In one embodiment, process 800 is performed by malware analysis system 132. In one embodiment, process 800 is performed by cloud security service 422 (e.g., and implemented using virtual clone manager 702). The process begins at 802 when device profile data of a plurality of devices on a target network, such as an enterprise network (e.g., the device profile data can be collected and reported using the various techniques disclosed herein, such as described above with respect to FIG. 4) is received.

At 804, one or more of the plurality of devices is selected as a target device to a clone. For example, the target device can be selected for cloning in the honey network to facilitate intelligent bridging of the honey network to a suspicious device if an internal communication from the suspicious device is directed to the target device (e.g., in which the suspicious device can be identified as suspicious if it is a device on the enterprise network that has been determined to be compromised, such as a device targeted by an APT attacker). As another example, another device that is in likely or recent/past communication with such a target device and/or suspicious device in the enterprise network can also be selected for cloning to provide for a more realistic honey network environment such as discussed above.

At 806, a VM image for the target device is selected. For example, based on one or more attributes in the device profile data for the target device (e.g., analyzed using device profile data analyzer 704), an appropriate VM image can be selected (e.g., using VM image selector 706) from a VM library such as described above.

At 808, the VM image is configured to synchronize attributes with device profile data attributes for the target device in the enterprise network. For example, the VM image can be configured (e.g., using VM image configurer 708) to synchronize attributes with device profile data attributes for the target device in the enterprise network.

At 810, the VM image is executed in a honey network configuration to emulate the target network. For example, the configured VM image is instantiated and executed in an instrumented VM environment (e.g., using VM instance launcher 710) that is executing a plurality of virtual clones that are synchronized with corresponding devices in the enterprise network environment.

At 812, an internal network communication is routed from a suspicious device in the target network to the virtual clone for the target device in the honey network. For example, an internal communication that is sent from the suspicious device that is directed to the target device can be routed (e.g., redirected) to the corresponding virtual clone of the target device executed in the instrumented VM environment to facilitate an intelligent bridging of the honey network to a suspicious device in an enterprise network (e.g., using a honey network routing policy 522 implemented by a data appliance 102). The network activities to/from the suspicious device can be monitored and logged using a firewall (e.g., data appliance 102) and any activities performed in the honey network can be monitored in the instrumented VM environment and such monitored activities can be logged (e.g., using honey network log 446).

Using the above-described techniques, the cloud security service can implement a high-fidelity virtual clone of one or more devices of the target network environment, and session traffic from a black holed device (e.g., a compromised device in the target network environment that is selected to be black holed) can perform high interactions with one or more virtual clones in the honey network. For example, assuming that a cloned active directory (AD) server (e.g., a virtual clone of the AD server) is instantiated in the honey network environment, and assume that the attacker has stolen credentials to access the AD server, then the attacker could potentially use an exploit and the credentials to gain control over the cloned AD server. Then, any communications from the cloned AD server to other devices can be allowed or blocked (e.g., based on a policy associated with such communications). An example policy can allow communications from the cloned AD server to other cloned devices (e.g., other virtual clones) in the honey network environment. For example, IP addresses associated with such session traffic from the honey network can be associated with bad IP addresses (e.g., used for malware and/or attackers for APT or other types of attacks). Also, communications from the AD server directed to external devices (e.g., remote devices accessible via the Internet) can be allowed, such as using techniques further described below with respect to FIG. 9. In some cases (e.g., based on a honey network policy), communications directed to devices in the target network that are not (yet) cloned in the honey network environment can also be allowed (e.g., to facilitate a more realistic interaction and to allow for further intelligence gathering, as such sessions from the honey network back to the actual target network can be monitored and logged based on such session traffic). In another example implementation, internal honey pots can also be deployed in the target enterprise network and can similarly be used for directing communications from a compromised device to appropriate internal honey pots for similarly providing intelligence gathering of a attacker's activities. At some point (e.g., based on a policy and/or determination that sufficient intelligence gathering has been performed with respect to the compromised device), the compromised device can be quarantined and/or cleaned, which would isolate and terminate any such activities by an attacker using that compromised device.

In one embodiment, if a communication from the AD server is directed to a second target device in the target enterprise network that has not (yet) been cloned in the honey network, then as similarly described above, a virtual clone can be instantiated for that second target device as similarly described above. In some implementations, this activity can be allowed to continue based on a policy (e.g., honey network policy) that can determine whether to terminate the honey network for these activities, based on a variety of criteria, such as time, resource usage of the VM environment, sufficient detection based on activities, and/or other criteria.

As will now be apparent from the above-described example process for intelligently bridging a honey network to a suspicious device in an enterprise network, various other use case scenarios for intelligently bridging a honey network to a suspicious device in an enterprise network can be provided to facilitate various threat intelligence and detection as described herein.

An example process for integrating a honey network with a target network to counter IP and peer-checking evasion techniques will now be described.

Example Process for Integrating a Honey Network with a Target Network to Counter IP and Peer-Checking Evasion Techniques As similarly discussed above, techniques for integrating a honey network to a suspicious device in a network (e.g., an enterprise network) are disclosed. For example, these techniques can integrate a honey network with a real target network to counter IP and peer-checking evasions techniques.

In one embodiment, a honey network is configured to route any communication attempt to a device (e.g., a host or other device of the enterprise network) that does not exist in the honey network back to the enterprise network to then be routed to that actual device in the real target enterprise network or to the Internet for external communications (e.g., to devices that are external to the enterprise network, such as remote devices accessible via the Internet). For example, such routing can be determined based on a policy (e.g., a honey network routing policy for the enterprise network, such as described above).

For example, if an (APT) attacker lands on a virtual device (e.g., virtual clone or high interaction honeypot system) within the honey network through any of the mechanisms described herein (e.g., using network communications from a compromised host that are redirected to the honey network), then the attacker may attempt to determine what other devices are reachable (e.g., other hosts, domain controller, print server, Internet, and/or other devices internal and/or external to the enterprise network). In this example, an attempted communication (e.g., session) to a device that is not cloned in the honey network (e.g., for which a virtual clone has not been instantiated in the honey network), or any device outside of the enterprise network (e.g., external devices), can be routed from the honey network to that device or to the Internet for external communications (e.g., to devices that are external to the enterprise network). In one embodiment, such external communications that are routed back from the honey network are routed back through the firewall device (e.g., network gateway firewall device or appliance, such as data appliance 102) of the enterprise network, and then routed to the external device. In particular, routing such communications back through the firewall device (e.g., network gateway firewall device or appliance, such as data appliance 102) of the enterprise network ensures that such network communications are from the IP address assigned to the firewall device (e.g., network gateway firewall device or appliance) of the enterprise network. As a result, the attacker would not be able to detect that such communications were really from the honey network and not an actual device residing in the enterprise network. As such, this can prevent an adversary from determining that a session is executing in a virtual environment (e.g., a sandbox environment) of the honey network.

As another example, these techniques for integrating a honey network with a target network to counter IP and peer-checking evasion can be used when performing an intelligent malware detonation of a malware sample in a virtual clone in the honey network. After the malware is detonated in the virtual clone in the honey network, an external network communication attempt performed by the detonated malware can be routed back through the firewall device (e.g., network gateway firewall device or appliance, such as data appliance 102) of the enterprise network to ensure that such network communications are from the external IP address assigned to the Internet-facing interface of the internet gateway (e.g., network gateway firewall device or appliance) of the enterprise network. This approach effectively provides for a proxying of any such external communications from the malware sample executed in the honey network via the data appliance of the target enterprise network to make it appear to any devices outside of the target enterprise network that the actual IP address of the target host is being used for such outbound communications over the Internet so that the attacker cannot detect that the host is not the actual host and is really a virtual host in a VM environment that is implementing the honey network. As such, this can prevent an adversary from determining that a session is executing in a virtual environment (e.g., a sandbox environment) outside of the honey network.

Thus, these techniques for integrating a honey network with a target network to counter IP and peer-checking evasion allows the IP address emanating from a virtual device in the honey network (e.g., a virtual clone executed on a VM server of the cloud security service) to appear to the external device to be associated with the target device in the target network environment as opposed to an IP address associated with the virtual device in the honey network (e.g., APT attacker's device would not see IP associated with the virtual clone in the honey network, but rather would see the IP address associated with an actual, physical target device in the target network environment, which can be provided using the routing table described above that includes a virtual device IP address to the target device IP address). In one embodiment, such external network communications from virtual devices are routed from the honey network to the target network environment, and in particular, routed through a proxy server in the target network environment (e.g., proxy server 450 as shown in FIG. 4) to proxy any such communications between the external device(s) and the virtual device(s) in the honey network.

In one embodiment, the honey network policy (e.g., allowed for specified IP addresses and/or specified Classless Inter-Domain Routing (CIDR) ranges) can allow communications (e.g., a session) from a virtual clone in the honey network to a target device in the target network environment (e.g., if a virtual clone does not exist for the target device or for other reasons). In this scenario, these techniques can similarly be applied for communications that are allowed to pass from a virtual device in the honey network to a target device in the target network environment such that peer checks by an attacker cannot be used to determine the existence of the honey network environment (e.g., sandboxing techniques).

Figure 9:
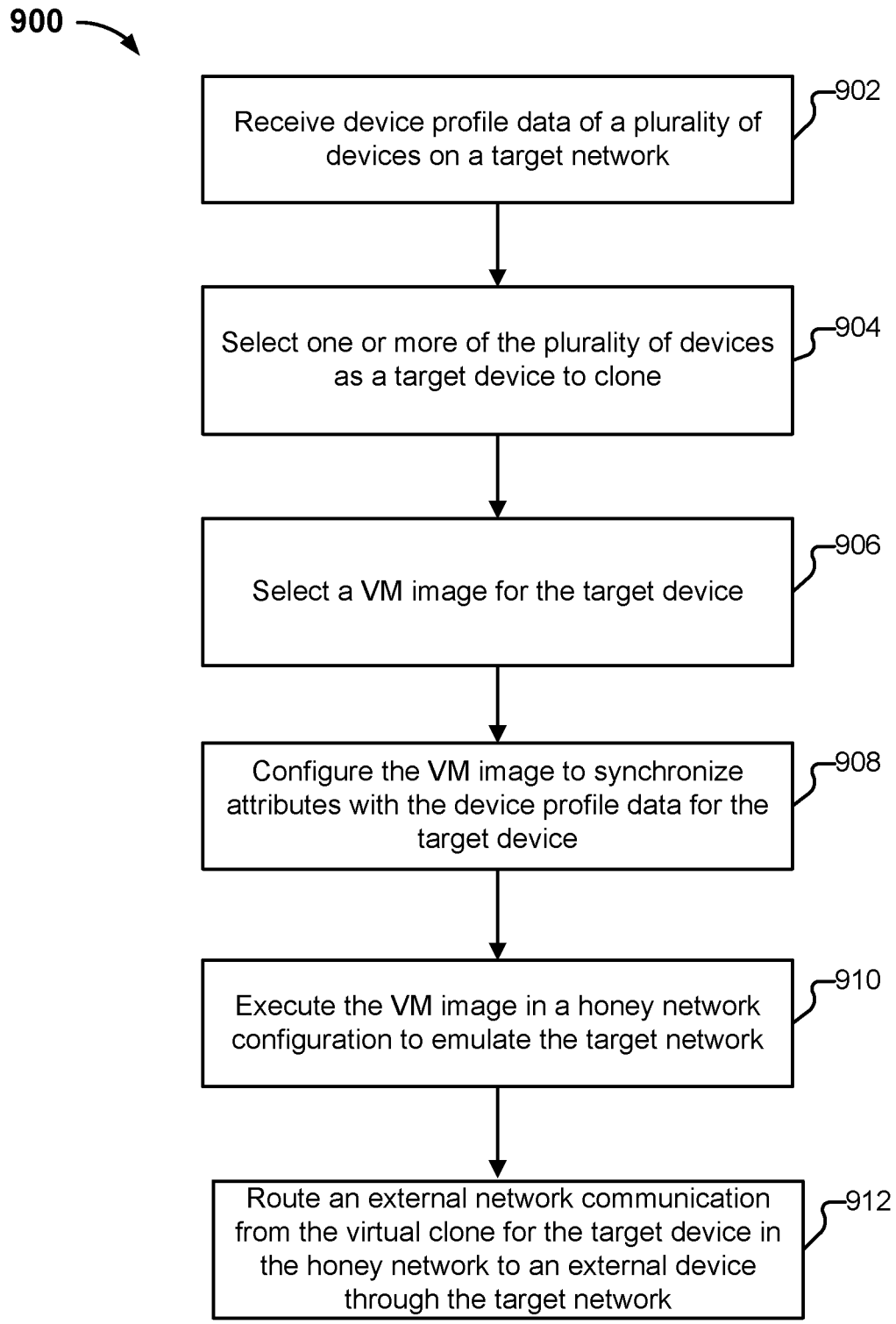
FIG. 9 is a flow diagram illustrating a process for integrating a honey network with a target network to counter IP and peer-checking evasion techniques in accordance with some embodiments.

FIG. 9 is a flow diagram illustrating a process for integrating a honey network with a target network to counter IP and peer-checking evasion techniques in accordance with some embodiments. In one embodiment, process 900 is performed by malware analysis system 132. In one embodiment, process 900 is performed by cloud security service 422 (e.g., and implemented using virtual clone manager 702). The process begins at 902 when device profile data of a plurality of devices on a target network, such as an enterprise network (e.g., the device profile data can be collected and reported using the various techniques disclosed herein, such as described above with respect to FIG. 4), is received.

At 904, one or more of the plurality of devices is selected as a target device to a clone. For example, the target device can be selected for cloning in the honey network to facilitate intelligent bridging of the honey network to a suspicious device if an internal communication from the suspicious device is directed to the target device (e.g., in which the suspicious device can be identified as suspicious if it is a device on the enterprise network that has been determined to be compromised, such as a device targeted by an APT attacker). As another example, another device that is in likely or recent/past communication with such a target device and/or suspicious device in the enterprise network can also be selected for cloning to provide for a more realistic honey network environment such as discussed above. As yet another example, the target device can be selected for cloning in the honey network to facilitate intelligent malware detonation using the honey network (e.g., malware that was directed to the target device, such as via a web download or email).

At 906, a VM image for the target device is selected. For example, based on one or more attributes in the device profile data for the target device (e.g., analyzed using device profile data analyzer 704), an appropriate VM image can be selected (e.g., using VM image selector 706) from a VM library such as described above.

At 908, the VM image is configured to synchronize attributes with device profile data attributes for the target device in the enterprise network. For example, the VM image can be configured (e.g., using VM image configurer 708) to synchronize attributes with device profile data attributes for the target device in the enterprise network.

At 910, the VM image is executed in a honey network configuration to emulate the target network. For example, the configured VM image is instantiated and executed in an instrumented VM environment (e.g., using VM instance launcher 710) that is executing a plurality of virtual clones that are synchronized with corresponding devices in the enterprise network environment.

At 912, an external network communication is routed from the virtual clone for the target device in the honey network to an external device through the target network. For example, an external communication that is sent from the virtual clone can be routed (e.g., redirected) back through the target network environment to facilitate an integration of a honey network with an enterprise network, such that the external communications are proxied using a proxy server (e.g., proxy server 450 as shown in FIG. 4) or a data appliance (e.g., data appliance 102) in the enterprise network to counter IP and peer-checking evasion techniques (e.g., using a honey network routing policy 522 implemented by a data appliance 102). The network activities to/from the suspicious device can be monitored and logged using a firewall (e.g., data appliance 102) and any activities performed in the honey network can be monitored in the instrumented VM environment and such monitored activities can be logged (e.g., using honey network log 446).

As will now be apparent from the above-described example process for integrating a honey network with a target network to counter IP and peer-checking evasion techniques, various other use case scenarios for integrating a honey network with a target network to counter IP and peer-checking evasion techniques can be provided to facilitate various threat intelligence and detection as described herein. Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor coupled to a memory, wherein the processor is configured to:
receive a malware sample at a cloud security service for detonation on a virtual clone for a target device in a honey network, wherein the malware sample is based at least in part on a suspicious network communication destined for the target device in a target network environment that was detected at a firewall device in the target network environment;
detonate the malware sample executed on the virtual clone for the target device in the honey network, wherein the virtual clone is executed in an instrumented virtual machine (VM) environment; and
route an external network communication that was initiated from the malware sample executed on the virtual clone for the target device in the honey network to an external device through the target network environment based on a honey network policy for proxying the external network communication through the firewall device in the target network environment to the external device based on a honey network routing table that provides a mapping between a first IP address of the virtual clone and a second IP address of the target device to counter IP and peer-checking evasion techniques, wherein the external device is external to the target network environment and is external to the honey network.

2. The system recited in claim 1, wherein the virtual clone is a customized VM image that is executed in the instrumented VM environment.

3. The system recited in claim 1, wherein a honey network configuration is synchronized to emulate a plurality of devices in the target network environment.

4. The system recited in claim 1, wherein the processor is further configured to:
monitor one or more activities of the virtual clone for the target device in the honey network, wherein the one or more activities are logged in a honey network log.

5. The system recited in claim 1, wherein the processor is further configured to:
generate a device profile data store that includes a plurality of attributes of each of a plurality of devices in the target network environment; and
instantiate another virtual clone in the honey network of one or more devices in the target network environment based on the honey network policy and based on one or more attributes for another target device in the device profile data store using a virtual clone manager, wherein the honey network is hosted by the cloud security service.

6. The system recited in claim 1, wherein the processor is further configured to:
select a VM image from a VM image library using a virtual machine (VM) image selector; and
configure a VM image to synchronize attributes of the VM image with attributes of the target device in the target network environment using a virtual machine (VM) image configurer, wherein the VM image is customized based on one or more of a plurality of attributes associated with the target device.

7. The system recited in claim 1, wherein the processor is further configured to:
instantiate a customized VM image in an instrumented VM environment using a virtual machine (VM) instance launcher, wherein the instantiated customized VM image corresponds to the virtual clone of the target device in the target network environment.

8. The system recited in claim 1, wherein the processor is further configured to:
select a VM image from a virtual machine (VM) image library that includes one or more VM images using a virtual clone manager, wherein the VM image library is customized based on one or more attributes for the target device in a device profile data store to generate a customized VM image, and wherein the customized VM image is executed in the instrumented VM environment.

9. The system recited in claim 1, wherein the processor is further configured to:
manage a plurality of virtual clones executed in the instrumented VM environment using a virtual machine (VM) instance manager, wherein the plurality of virtual clones executed in the instrumented VM environment corresponds to the honey network.

10. The system recited in claim 1, wherein the honey network routing table is updated if at least one of the virtual clones is removed from the honey network, if a new virtual clone is added in the honey network, and/or to update an availability field value for at least one of the virtual clones.

11. The system recited in claim 1, wherein the external network communication from the malware sample is routed through the firewall device in the target network environment so that the external network communication from the malware sample to the external device is from an external IP address assigned to an Internet-facing interface of the firewall device in the target network environment to appear to the external device to be associated with the target network environment as opposed to another IP address associated with the cloud security service facilitating the honey network, wherein the honey network routing table includes IP-based routing rules for integration of the target network environment with the honey network to indicate whether or not a communication from a compromised device to the target device should be redirected to the virtual clone in the honey network if the virtual clone that was previously instantiated is available.

12. The system recited in claim 1, wherein the honey network policy is configured to include a plurality of specified IP addresses and/or specified Classless Inter-Domain Routing (CIDR) ranges for allowed communications from the virtual clone in the honey network to the target device in the target network environment, and wherein if another virtual clone in the honey network does not exist for another target device, then the external network communication is routed from the virtual clone in the honey network to the another device in the target network environment such that peer checks by an attacker cannot be used to determine that the malware sample was detonated on the virtual clone in the honey network.

13. A method, comprising:
receiving a malware sample at a cloud security service for detonation on a virtual clone for a target device in a honey network, wherein the malware sample is based at least in part on a suspicious network communication destined for the target device in a target network environment that was detected at a firewall device in the target network environment;
detonating the malware sample executed on the virtual clone for the target device in the honey network, wherein the virtual clone is executed in an instrumented virtual machine (VM) environment; and
routing an external network communication that was initiated from the malware sample executed on the virtual clone for the target device in the honey network to an external device through the target network environment based on a honey network policy for proxying the external network communication through the firewall device in the target network environment to the external device based on a honey network routing table that provides a mapping between a first IP address of the virtual clone and a second IP address of the target device to counter IP and peer-checking evasion techniques, wherein the external device is external to the target network environment and is external to the honey network.

14. The method of claim 13, wherein the virtual clone is a customized VM image that is executed in the instrumented VM environment.

15. The method of claim 13, wherein a honey network configuration is synchronized to emulate a plurality of devices in the target network environment.

16. The method of claim 13, further comprising:
monitoring one or more activities of the virtual clone for the target device in the honey network, wherein the one or more activities are logged in a honey network log.

17. A computer program product, the computer program product being embodied in a non-transitory tangible computer readable storage medium and comprising computer instructions for:
receiving a malware sample at a cloud security service for detonation on a virtual clone for a target device in a honey network, wherein the malware sample is based at least in part on a suspicious network communication destined for the target device in a target network environment that was detected at a firewall device in the target network environment;
detonating the malware sample executed on the virtual clone for the target device in the honey network, wherein the virtual clone is executed in an instrumented virtual machine (VM) environment; and
routing an external network communication that was initiated from the malware sample executed on the virtual clone for the target device in the honey network to an external device through the target network environment based on a honey network policy for proxying the external network communication through the firewall device in the target network environment to the external device based on a honey network routing table that provides a mapping between a first IP address of the virtual clone and a second IP address of the target device to counter IP and peer-checking evasion techniques, wherein the external device is external to the target network environment and is external to the honey network.

18. The computer program product recited in claim 17, wherein the virtual clone is a customized VM image that is executed in the instrumented VM environment.

19. The computer program product recited in claim 17, wherein a honey network configuration is synchronized to emulate a plurality of devices in the target network environment.

20. The computer program product recited in claim 17, further comprising computer instructions for:
monitoring one or more activities of the virtual clone for the target device in the honey network, wherein the one or more activities are logged in a honey network log.

* * * * *